United States Patent [19]
Chaya

[11] Patent Number: 5,485,434
[45] Date of Patent: Jan. 16, 1996

[54] MAGNETO-OPTICAL DISK APPARATUS FOR RECORDING AND/OR REPRODUCING INFORMATION USING MODULATED AND CONSTANT MAGNETIC FIELD APPLYING DEVICES

[75] Inventor: Masahiko Chaya, Yokohama, Japan

[73] Assignee: Canon Kabushiki Kaisha, Tokyo, Japan

[21] Appl. No.: 98,809

[22] Filed: Jul. 29, 1993

Related U.S. Application Data

[63] Continuation-in-part of Ser. No. 15,432, Feb. 9, 1993, abandoned.

[30]  Foreign Application Priority Data

Jan. 28, 1993 [JP] Japan .................................. 5-031167

[51] Int. Cl.$^6$ ..................................................... G11B 11/00
[52] U.S. Cl. .............................. 369/13; 369/244; 360/114
[58] Field of Search .............................. 369/13, 244, 215, 369/77.2, 14, 44.14, 44.39, 110, 219, 220, 221, 284; 360/114, 59; 365/122

[56]  References Cited

U.S. PATENT DOCUMENTS 5,278,809  1/1994  Ogata ......................................... 369/13

*Primary Examiner*—Ali Neyzari
*Attorney, Agent, or Firm*—Fitzpatrick, Cella, Harper & Scinto

[57]  ABSTRACT

A magneto-optical disk apparatus performs at least one of recording and reproduction of information on or from a magneto-optical recording medium having a disk shape. The apparatus is provided with an optical device including an objective lens, for irradiating the medium with a light beam, and a first magnetic field applying device for applying a magnetic field modulated according to information to a portion on the medium which is irradiated with the light beam. The first magnetic field applying device includes a magnetic head for generating a magnetic field and a floating-type slider for supporting the magnetic head. The apparatus further includes a second magnetic field applying device for applying to the irradiated portion on the medium a constant magnetic field an orientation of which is inclined with respect to the optical axis of the objective lens, and a moving device for moving the first and second magnetic field applying devices and the optical device together in a radial direction of the medium.

22 Claims, 18 Drawing Sheets

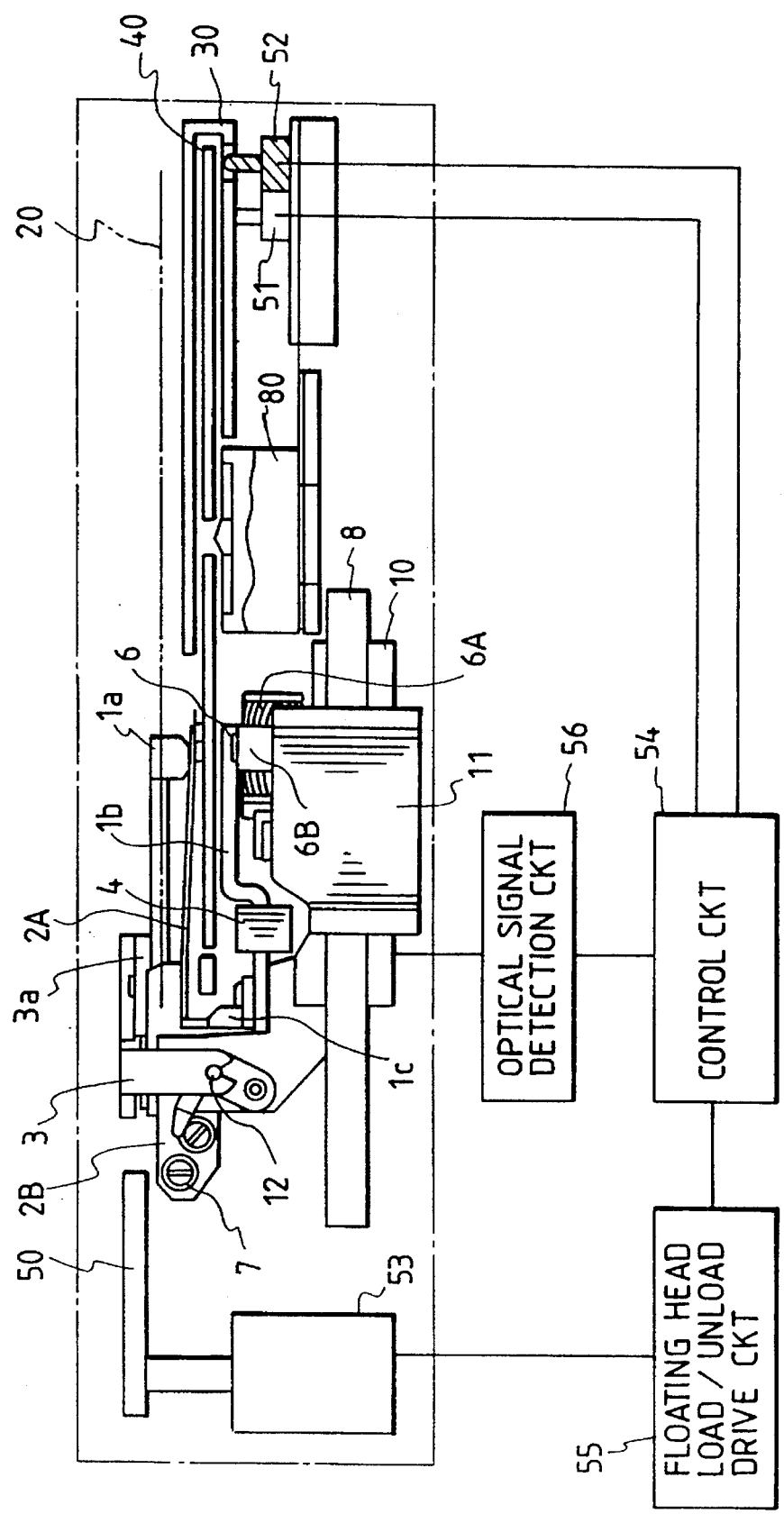

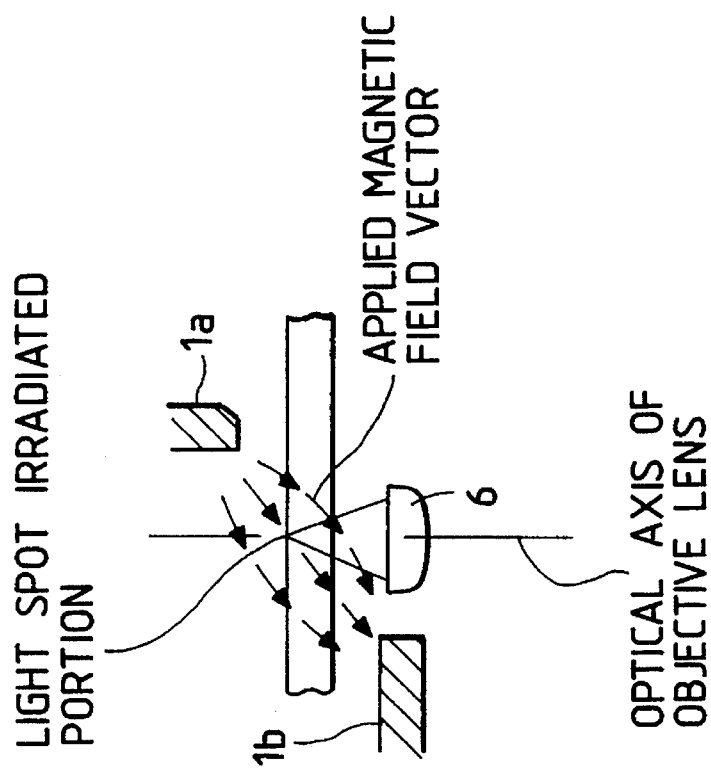
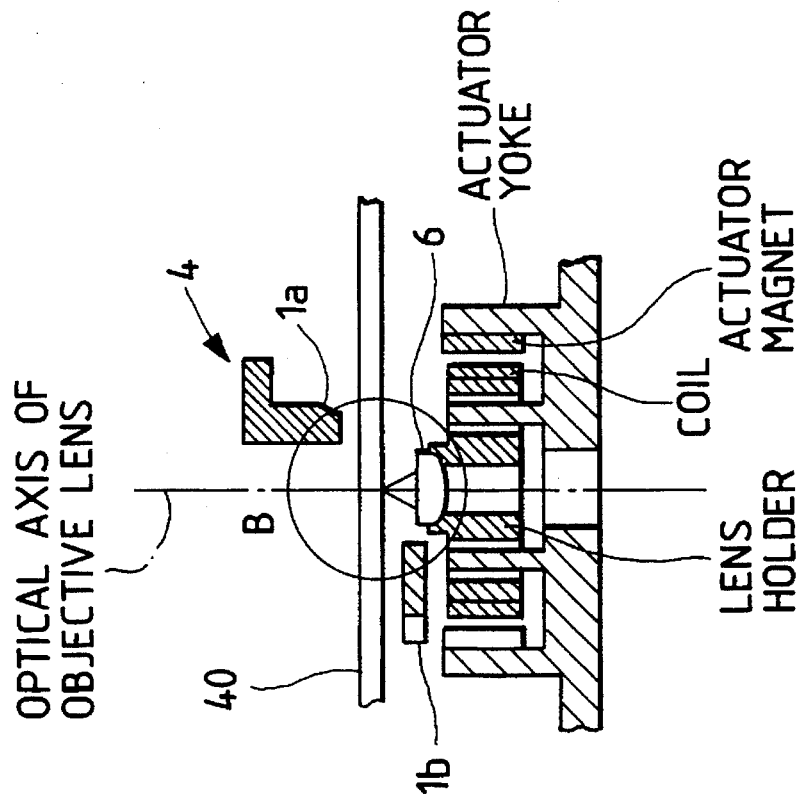

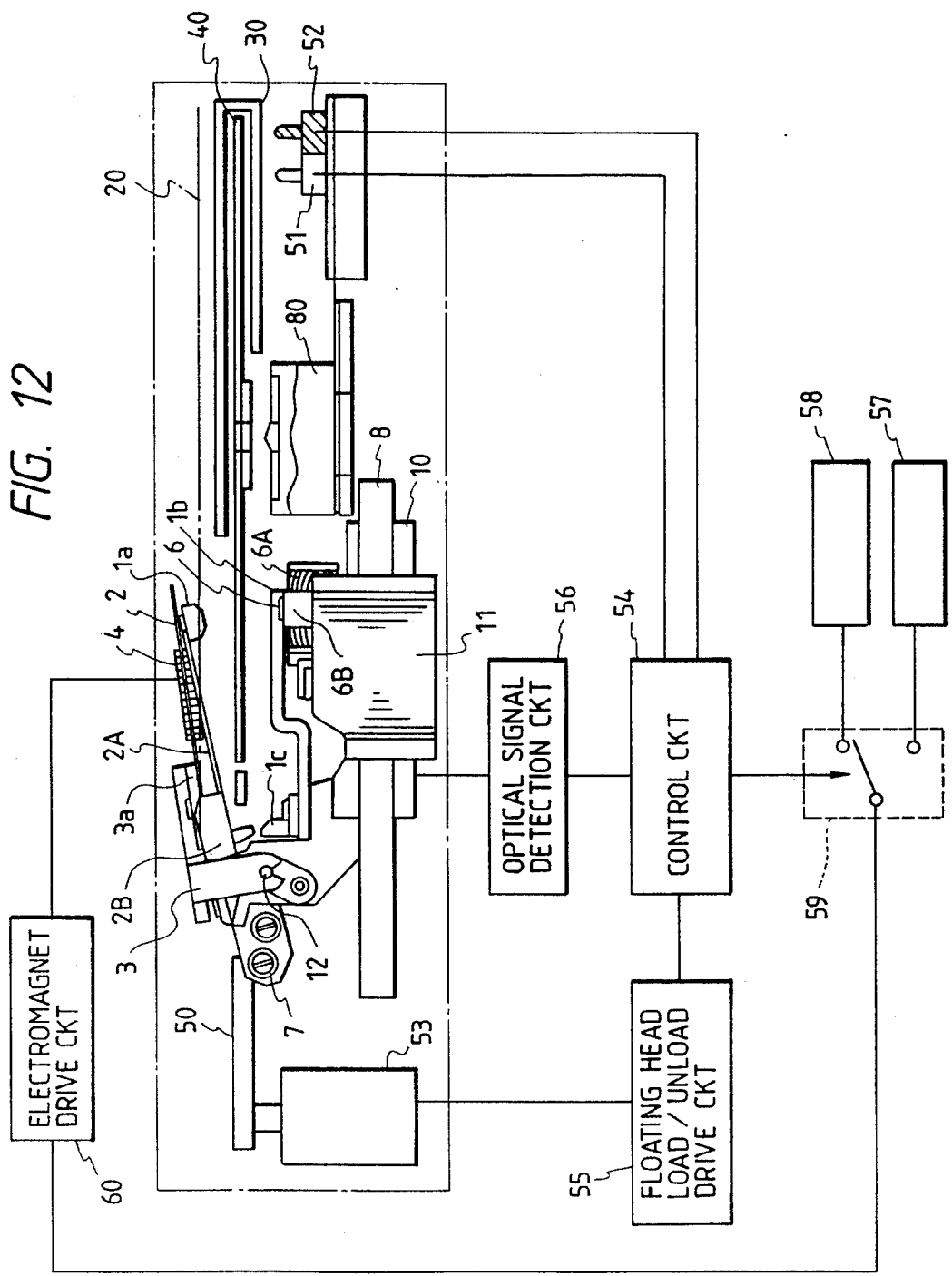

MAGNETO-OPTICAL DISK APPARATUS FOR RECORDING AND/OR REPRODUCING INFORMATION USING MODULATED AND CONSTANT MAGNETIC FIELD APPLYING DEVICES

The subject application is a continuation-in-part of U.S. application, Ser. No. 08/015,432, filed Feb. 9, 1993 now abandoned.

BACKGROUND OF THE INVENTION

1. Field of the Invention

The present invention relates to an objective lens driving apparatus for controlling operation to move an objective lens in the seeking direction, in the tracking direction, and in the focusing direction relative to a magneto-optical recording medium of a disk shape, and to an optical head provided with first and second bias magnetic field generating apparatuses for performing information recording by respective modulation methods different from each other in a small region at which a laser beam through the objective lens forms a beam spot, and specifically to a magneto-optical disk apparatus provided with such an optical head.

2. Related Background Art

A magneto-optical disk apparatus of this type is required to be capable of recording and/or reproducing information in either of magneto-optical recording media in which information is recorded in the optical modulation method and those in which information is recorded in the magnetic field modulation method. In the optical modulation method, a constant magnetic field is applied by a bias magnetic field generating apparatus to a recording region on a magneto-optical recording medium and a laser beam modulated according to recording information is applied from an optical head to the recording region. The magneto-optical recording medium for the optical modulation method is for example a 3.5 inch magneto-optical disk, which is based on the first-generation ISO (as will hereinafter be referred to as ISO). In contrast, in the magnetic field modulation method, a constant laser beam is applied from an optical head to a recording region and a magnetic field modulated according to recording information is applied from a bias magnetic field generating apparatus to the recording region. In summary, the magneto-optical disk apparatus must be compatible for use with such media.

Thus, the above magneto-optical disk apparatus employs such a structure that either of two types of bias magnetic field generating apparatus can be selectively used, as shown in FIG. 1, FIG. 2A, and FIG. 2B. One of the two bias magnetic field generating apparatuses is a fixed bias magnetic field generating apparatus as denoted by numeral 102, which applies a constant magnetic field to a magneto-optical recording medium for optical modulation recording based on the ISO to perform recording based on recording information from the optical head, while the other of the two bias magnetic field generating apparatuses is a bias magnetic field generating apparatus as denoted by numeral 101 for the magnetic field modulation recording method, which has a magnetic field generating portion (not shown) with less turns for modulating a magnetic field at a high speed. The bias magnetic field generating apparatus 101 is to be kept at a gap of several μm to a disk surface of the magneto-optical recording medium in order to obtain a necessary magnetic field strength in a restricted small region, and is provided with a control mechanism (not shown) for that purpose.

A laser beam emitted from a light source (not shown) of a stationary optical system is reflected for example by a bending mirror and is then converged by an objective lens 103 to form a beam spot on a recording layer of the magneto-optical recording medium. The objective lens 103 is supported by a lens holder 103A, and the lens holder 103A is mounted on an objective lens driving apparatus 105 through an elastic support mechanism 103B such as a plate spring. The lens holder 103A is moved to effect focusing of the beam through the objective lens 103 on the recording medium, and the objective lens driving apparatus 105 is moved to effect the seeking operation and the tracking operation with the beam.

A constant magnetic field is applied to a small region including the beam spot and its neighboring regions by a magnetic field generating portion (magnetic head) arranged in the bias magnetic field generating apparatus 101 for magnetic field modulation recording. Information is written in the recording medium in correspondence with the polarity of the magnetic field. The bias magnetic field generating apparatus 101 is fixed onto a second driving mechanism 104. The objective lens driving apparatus 105 and the driving mechanism 104 are controlled independently to move in the radial direction of the disk.

Appropriate driving means (not shown) makes the fixed bias magnetic field generating apparatus 102 step back in the direction of the arrow a when the bias magnetic field generating apparatus 101 is used in the modulated magnetic field recording method (see FIG. 2A). Then, the bias magnetic field generating apparatus 101 becomes ready to move over the entire recording region on the magneto-optical disk (magneto-optical recording medium), and the fixed bias magnetic field generating apparatus 102 will never interfere with the bias magnetic field generating apparatus 101 and the driving mechanism thereof.

As described, the conventional example as shown in FIG. 1, FIG. 2A, and FIG. 2B is provided with the two types of bias magnetic field generating apparatuses, preparing for use of the magneto-optical disk for optical modulation recording based on the ISO and for use of the magneto-optical disk for magnetic field modulation recording. The fixed bias magnetic field generating apparatus 102 steps up over the bias magnetic field generating apparatus 101 in the conventional example while the bias magnetic field generating apparatus 101 is in operation for magnetic field modulation recording, which is disadvantageously against a desire to make the apparatus more compact, simpler, and thinner. In particular, complicated means or mechanisms are necessary for detecting a relative position between the objective lens driving apparatus and the respective bias magnetic field generating apparatuses and for positioning the apparatuses, which inevitably causes the structure of the apparatus to be complicated.

It is also necessary that the driving portion of the bias magnetic field generating apparatus 101 be withdrawn or moved in the radial direction of the recording medium in order to bring the fixed bias magnetic field generating apparatus 102 closer to the vicinity of the disk surface for optical modulation recording. A substantial length is required for the withdrawal of the driving portion and a mechanism for withdrawal or movement is necessary, which also makes the apparatus complicated.

SUMMARY OF THE INVENTION

The present invention has been accomplished taking into account the above-described circumstances. It is an object of the present invention to provide a magneto-optical disk apparatus having the compatibility for use of two types of recording methods, which can perform recording and reproduction of information in a magneto-optical disk for optical modulation recording based on the first-generation ISO and in a magneto-optical disk for magnetic field modulation recording, which can be made compact and thin, which can be made with a simple mechanism for step-back operation so as to decrease the number of constituent parts and the production cost, and which can avoid the negative effect of the floating magnetic field in magnetic field modulation recording.

The above objects can be achieved in the present invention by a magneto-optical disk apparatus which performs at least one of recording and reproduction of information in a magneto-optical recording medium of disk shape, comprising:

optical means comprising an objective lens, for irradiating the medium with a light beam;

first magnetic field applying means for applying a magnetic field modulated according to information to a portion on the medium which is irradiated with the light beam, said first magnetic field applying means comprising a magnetic head for generating a magnetic field and a floating-type slider for supporting said magnetic head;

second magnetic field applying means for applying to the irradiated portion on said medium a constant magnetic field an orientation of which is inclined with respect to an optical axis of said objective lens; and moving means for moving said first and second magnetic field applying means and said optical means together in a radial direction of said medium.

The above objects also can be achieved by an optical head used to perform at least one of recording and reproduction of information in a magneto-optical recording medium of disk shape, comprising:

optical means comprising an objective lens, for irradiating the medium with a light beam;

first magnetic field applying means for applying a magnetic field modulated according to information to a portion on the medium which is irradiated with the light beam, said first magnetic field applying means comprising a magnetic head for generating a magnetic field and a floating-type slider for supporting said magnetic head;

second magnetic field applying means for applying to the irradiated portion on said medium a constant magnetic field an orientation of which is inclined with respect to an optical axis of said objective lens; and moving means for moving said first and second magnetic field applying means and said optical means together in a radial direction of said medium.

In the arrangement of the present invention as described, the second magnetic field applying means for optical modulation applies to the beam-irradiated portion on the medium a constant magnetic field the orientation of which is inclined with respect to the optical axis of the objective lens, so that the first magnetic field applying means and the second magnetic field applying means may be kept from interfering with each other without need to withdraw the second magnetic field applying means while the first magnetic field applying means for magnetic field modulation is operating on the medium.

Therefore, a mechanism is unnecessary for withdrawing the second magnetic field applying means from the medium surface during the operation of the first magnetic field applying means, whereby the apparatus can be designed more compact.

BRIEF DESCRIPTION OF THE DRAWINGS

FIG. 6, FIG. 7, and FIG. 8A are side views to show states of use of the apparatus as shown in FIG. 4;

FIG. 8B is a cross section along A—A in FIG. 8A;

FIG. 8C is an enlarged view of portion B in FIG. 8B;

FIG. 12, FIG. 13, and FIG. 14 are side views to show states of use of a second embodiment of the present invention;

DETAILED DESCRIPTION OF THE PREFERRED EMBODIMENTS

Figure 1:
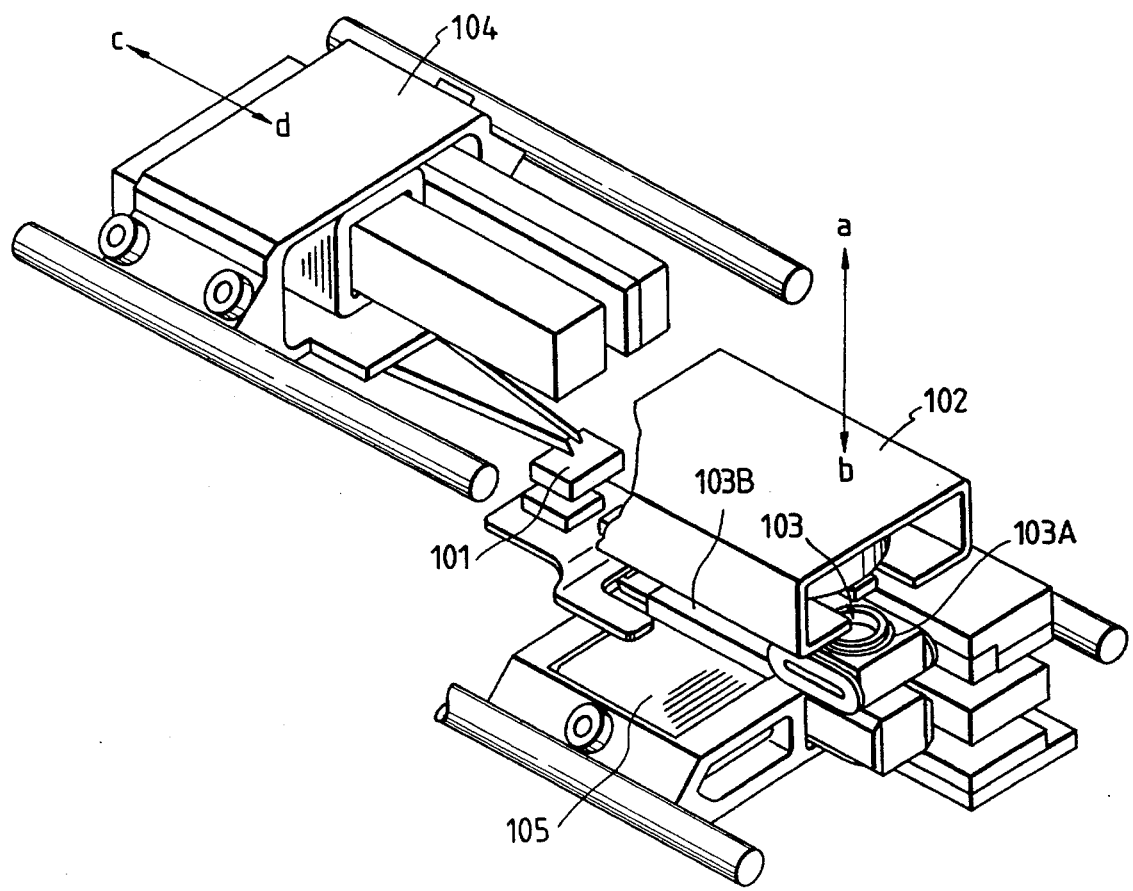
FIG. 1 is a perspective view of a conventional example of a magneto-optical disk apparatus.
Figure 2A:
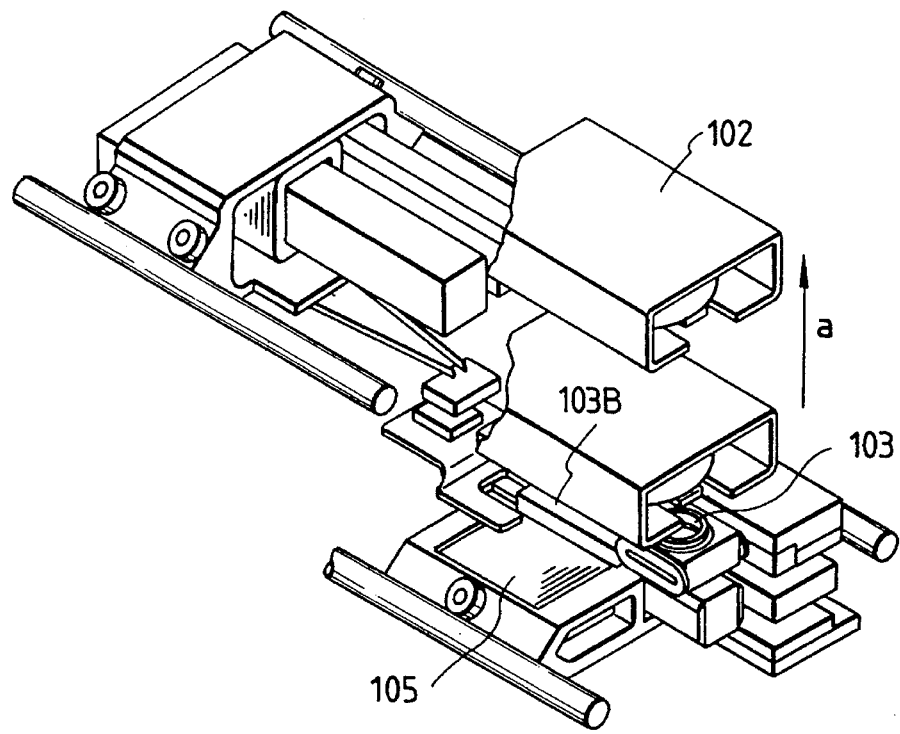
FIG. 2A and FIG. 2B are perspective views to illustrate states of use of the conventional example.
Figure 2B:
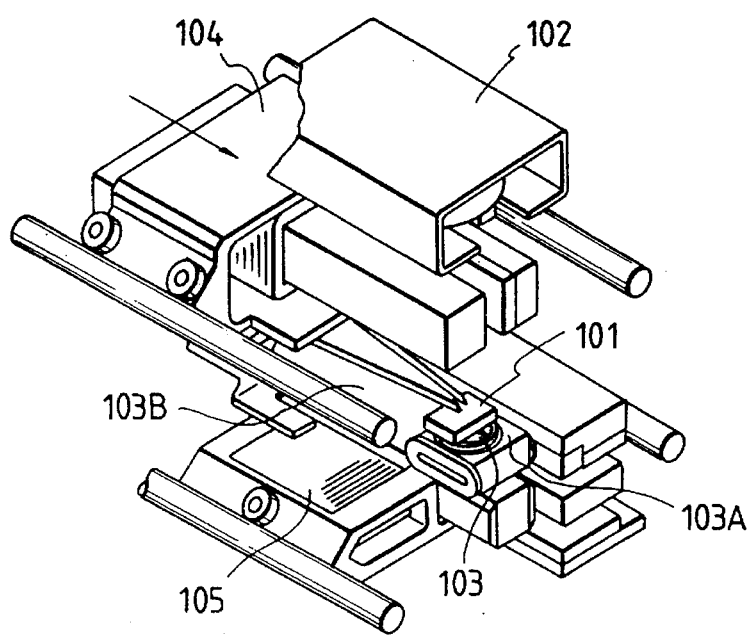
Figure 3:
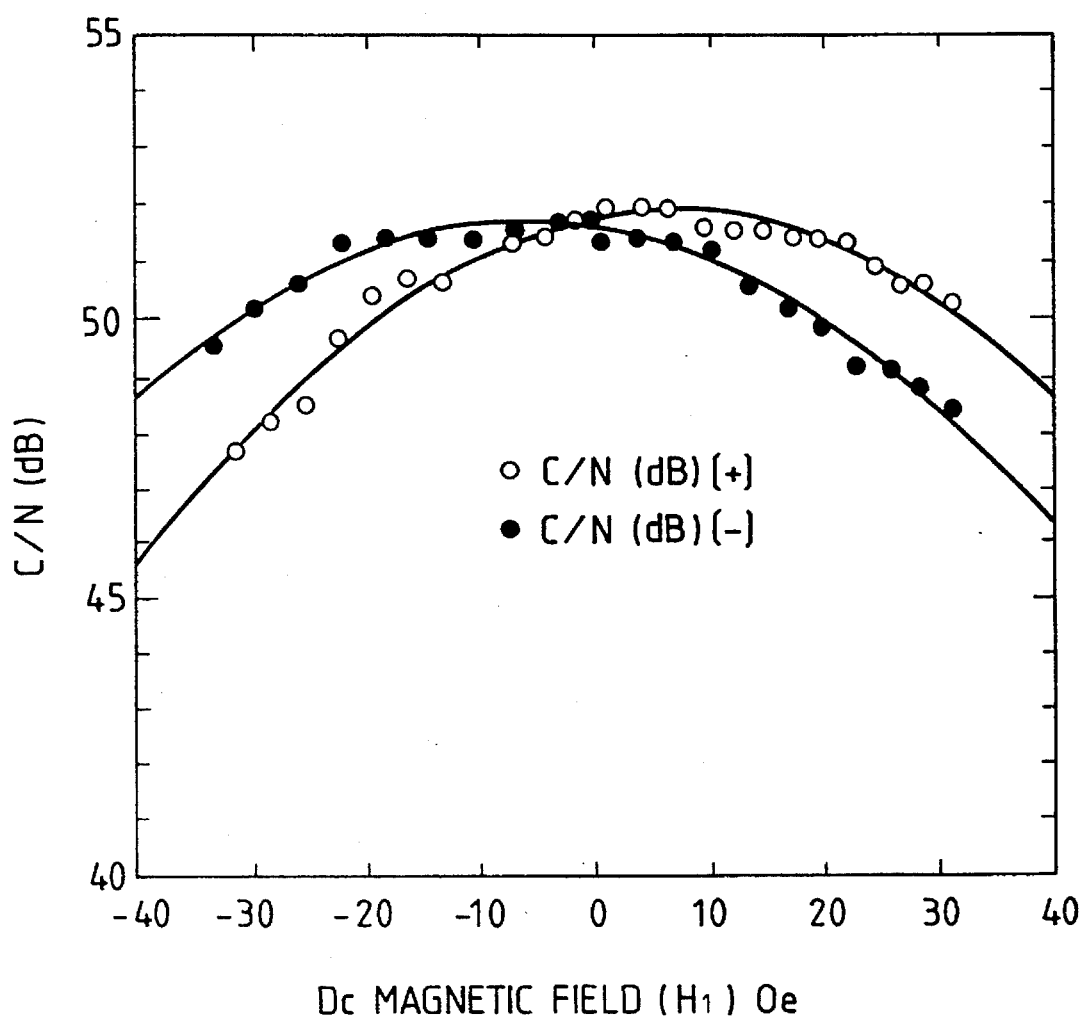
FIG. 3 is a graph to show a C/N ratio in magnetic field modulation recording against a floating magnetic field during magnetic field modulation.
Figure 4:
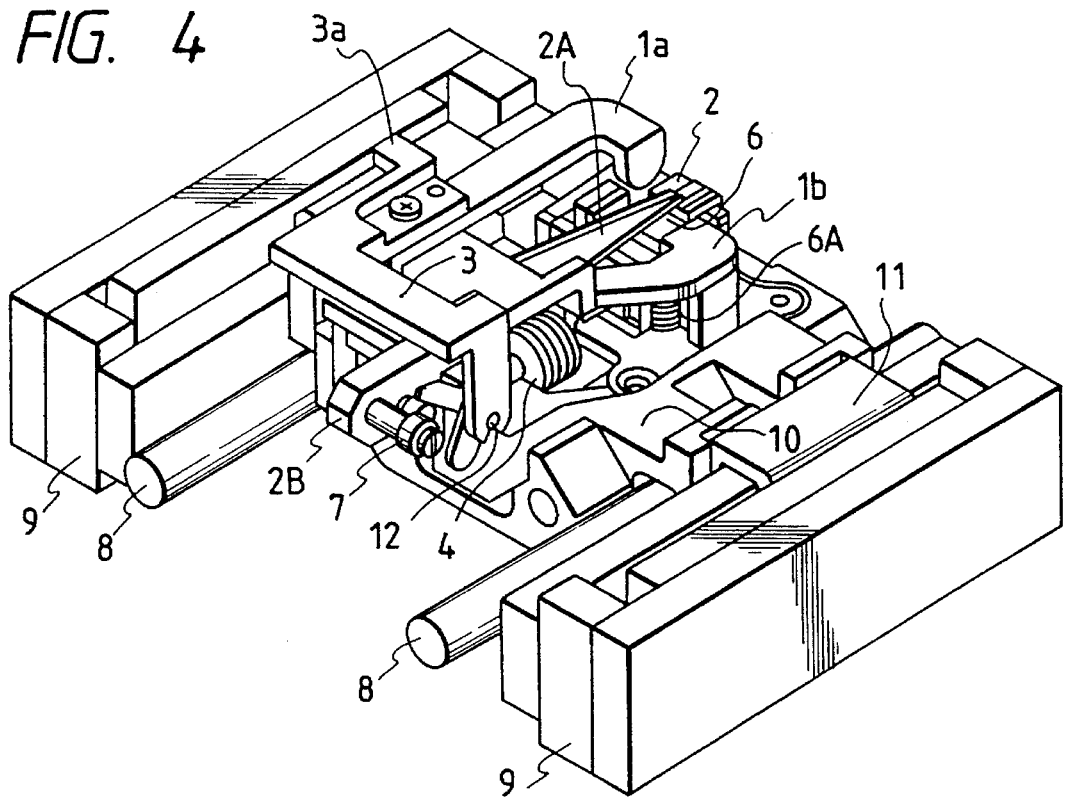
FIG. 4 is a perspective view to show a first embodiment of the present invention.
Figure 5:
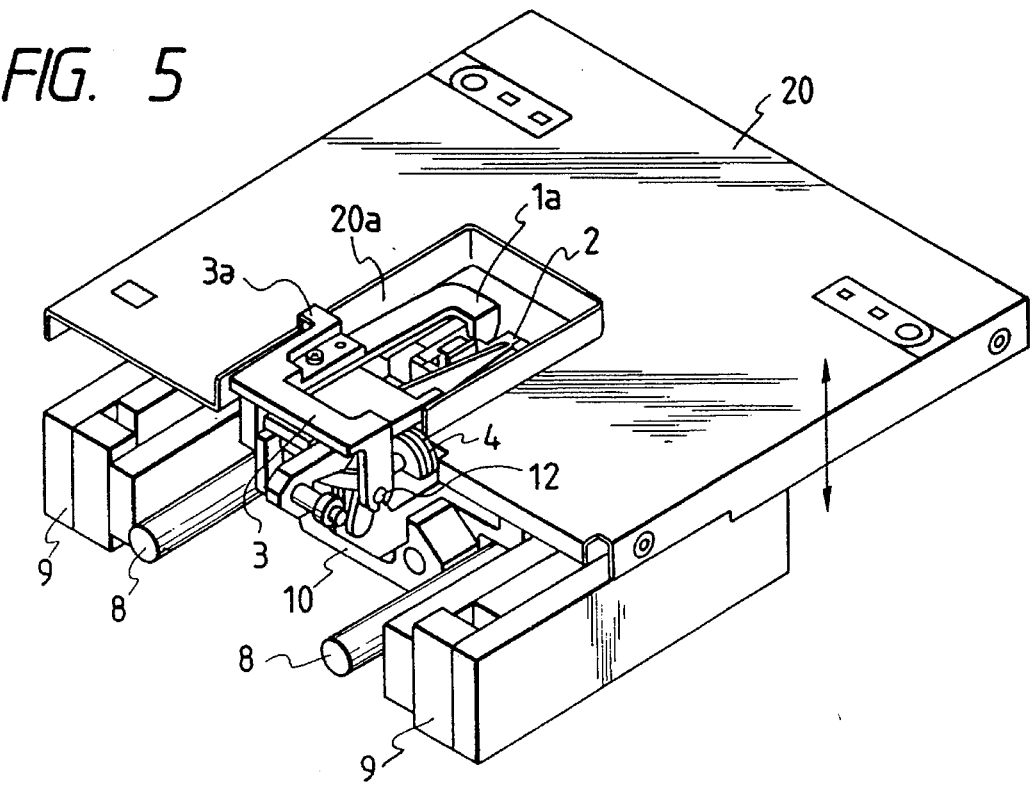
FIG. 5 is a perspective view to show a positional relation between the apparatus as shown in FIG. 4 and a cassette holder.

The first embodiment of the present invention will be described in detail with reference to FIG. 4 to FIG. 8C. FIG. 4 shows a magneto-optical disk apparatus according to the present invention. The magneto-optical disk apparatus is provided with a bias magnetic field generating apparatus A for recording by the magnetic field modulation method as a first bias magnetic field generating apparatus and with a bias magnetic field generating apparatus B for recording by the optical modulation method as a second bias magnetic field generating apparatus.

The bias magnetic field generating apparatus A is arranged as well known such that a magnetic head is mounted as a bias magnetic field generating portion on a floating-type slider 2, that a support member 2B supports the floating-type slider 2 through a support spring 2A as a load beam, and that the support member 2B is journaled through a rotation shaft 12 on a carriage 10 on which an optical system is mounted. The carriage 10 is structured to move along a guide rail 8 extending in the radial direction of a magneto-optical recording medium (as will be referred to as a magneto-optical disk) by means of a linear motor comprised of a magnetic circuit 9 and a coil 11, which is mounted on the carriage 10. The magneto-optical disk 40 is encased in a disk cassette 30 and the disk cassette 30 including the magneto-optical disk 40 is loaded in a cassette holder 20, which is a loading portion of the apparatus body, at an end of the guide rail 8.

A solenoid driving mechanism 53 having a step-back lever 50 is provided as a lift mechanism in the apparatus body to make the optical head of the bias magnetic field generating apparatus A step back away from a surface of the magneto-optical disk 40 (to prevent interference with the cassette holder 20), when the disk cassette 30 is loaded in or ejected out of the loading portion. The step-back lever 50 presses down an engagement contact portion 7 of a roll shape disposed at the rear end of the support member 2B to rotate the bias magnetic field generating apparatus A about the rotation shaft 12 for step-back.

The bias magnetic field generating apparatus B comprises an electromagnet 4 and a core member 1 of a substantial ring shape having a gap portion at a part thereof, which are mounted on the carriage 10. The core member 1 has two ends 1a, 1b (magnetic field release portions) in the gap portion, which are located on either side of the magneto-optical disk 40 such that a small region of a beam spot formed on the disk surface of the magneto-optical disk 40 through an optical system (as detailed later) mounted on the carriage 10 is located in the gap portion. The optical system has an objective lens 6 in the present embodiment, and the objective lens 6 is set in a lens holder 6B, which is slid by means of a coil 6A. When a voltage is applied to the coil 6A, the objective lens 6 is vertically moved for focusing.

The core member 1 is composed of at least two members, specifically three members in this embodiment, two of which are upper and lower members and the other of which is a joint core member. One of the members is a movable core member forming one end 1a in the gap portion on the side where the first bias magnetic field generating apparatus is located. The movable core member can be loaded and unloaded to the disk surface. A mechanism for carrying out the loading or unloading operation is composed of an upper core support member 3 journaled about the common axis of the rotation shaft 12 on the carriage 10. The movable core member is attached to the upper core support member 3. Further, an engagement portion 3a is provided on the upper core support member 3 such that while the cassette holder 20 ascends from the load portion to take the disk cassette 30 out, a protrusion 20a provided on the cassette holder 20 engages with the engagement portion 3a then to lift the movable core member independent of the bias magnetic field generating apparatus A. A coil of the electromagnet 4 is wound around the other core member (lower core member) forming the other end 1b in the gap portion in the present embodiment. The lower core member 1b and the joint core member as denoted by numeral 1c are connected to each other while being fixedly supported on the carriage 10. When the one end 1a of the movable core member is brought down to near the recording surface of the magneto-optical disk 40, the upper end 1d of the joint core member 1c contacts with a bottom end 1e of the movable core member, forming the core member 1 (of a substantial ring shape having a gap) in the form of a C-shape, magnetically continuous as a whole.

There are provided on the apparatus body a disk type detection sensor (detecting means) 51 and a disk cassette load check sensor (detecting means) 52, which are located in the cassette holder 20. The latter sensor also serves as a writing inhibition sensor. Information detected by these sensors is transmitted to a control circuit 54, and the control circuit 54 outputs a control signal to a drive circuit 55 for driving the solenoid driving mechanism 53. Optical signals from the optical system are sent through a detection circuit 56 to the control circuit 54, which generates necessary control signals based on judgement with the optical signals. A necessary recording or reproduction operation is carried out based on the generated signals. Mechanisms for the recording or reproduction operation are not shown in the drawings.

The following discussion explains operations of the bias magnetic field generating apparatuses A and B in correspondence with the types of disk mounted in the load portion with reference to FIG. 6 to FIG. 8A. Before the disk cassette 30 is loaded in the cassette holder 20 (see FIG. 6), the solenoid driving mechanism 53 keeps the step-back lever 50 down, so that the support member 2B is kept rotated about the rotation shaft 12. By that, the slider 2, that is, the magnetic head of the first bias magnetic field generating apparatus, moves upward to step back. Further, the upper core support member 3 engages with the protrusion 20a of the upper cassette holder 20 through its engagement portion 3a, whereby the end 1a of the movable core member moves upward to step back.

When the cassette holder 20 is loaded in the disk cassette 30 and the cassette holder 20 descends to be set in the load portion of the apparatus body, the sensors 51 and 52 start operating to detect a type of the magneto-optical disk 40 in the disk cassette 30 (whether a disk for magnetic field modulation or a disk for optical modulation), a mount condition of the disk cassette, and whether writing is inhibited, then to transmit necessary signals to the control circuit 54. The magneto-optical disk 40 in the disk cassette is driven by a spindle motor 80 to rotate at the same time. The following operations are carried out based on control signals from the control circuit 54: The carriage 10 of the objective lens driving apparatus starts the seeking operation; the recording surface of the disk 40 is irradiated with a laser beam through the objective lens 6; and the tracking and focusing controls are carried out obtaining information from the reflected beam from the recording surface to access a beam spot to a certain address on the disk. Recording or reproduction is performed in this state. While the cassette holder 20 is descending, the core support member 3 also descends while keeping the engagement portion 3a engaged with the protrusion 20a, whereby the end 1a of the movable core member approaches the recording surface of the magneto-optical disk 40 to the vicinity thereof. In this state, the movable core member contacts with the joint core member 1c as described to form a core of C shape as a whole (in the form of a substantial ring having a gap) while controlling a gap therebetween.

Figure 6:
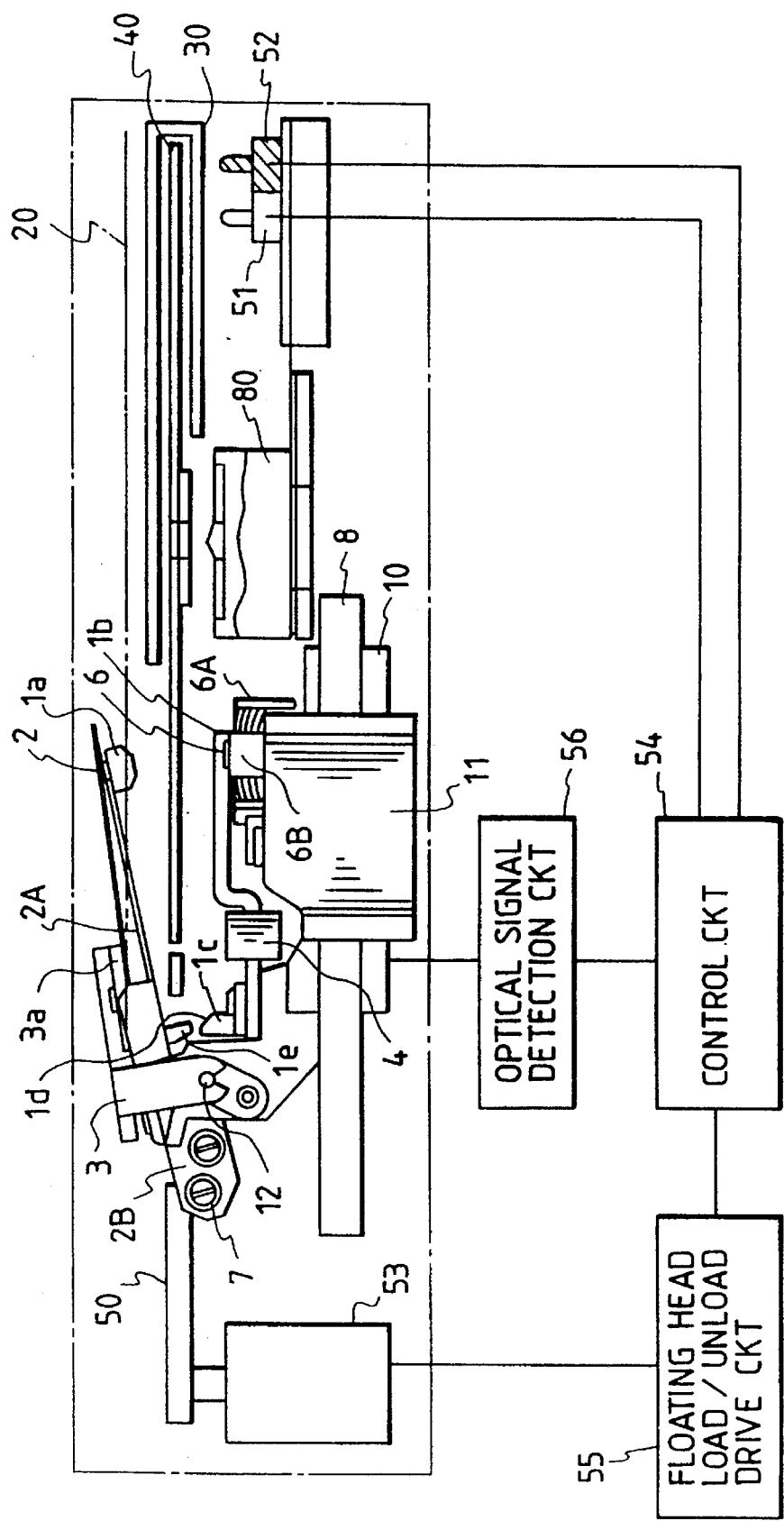

The following steps are carried out when the sensor 51 judges that the magneto-optical disk 40 is for magnetic field modulation: As shown in FIG. 6, a signal is supplied from the control circuit 54 to the drive circuit 55 to drive the solenoid driving mechanism 53, then to lift the step-back lever 50, to return the support member 2B from the step-back position to an operation position, and to keep the slider 2 floating at a certain gap over the recording surface of the magneto-optical disk 40. Then, recording or reproduction may be executed by the first bias magnetic field generating apparatus A.

Figure 8A:
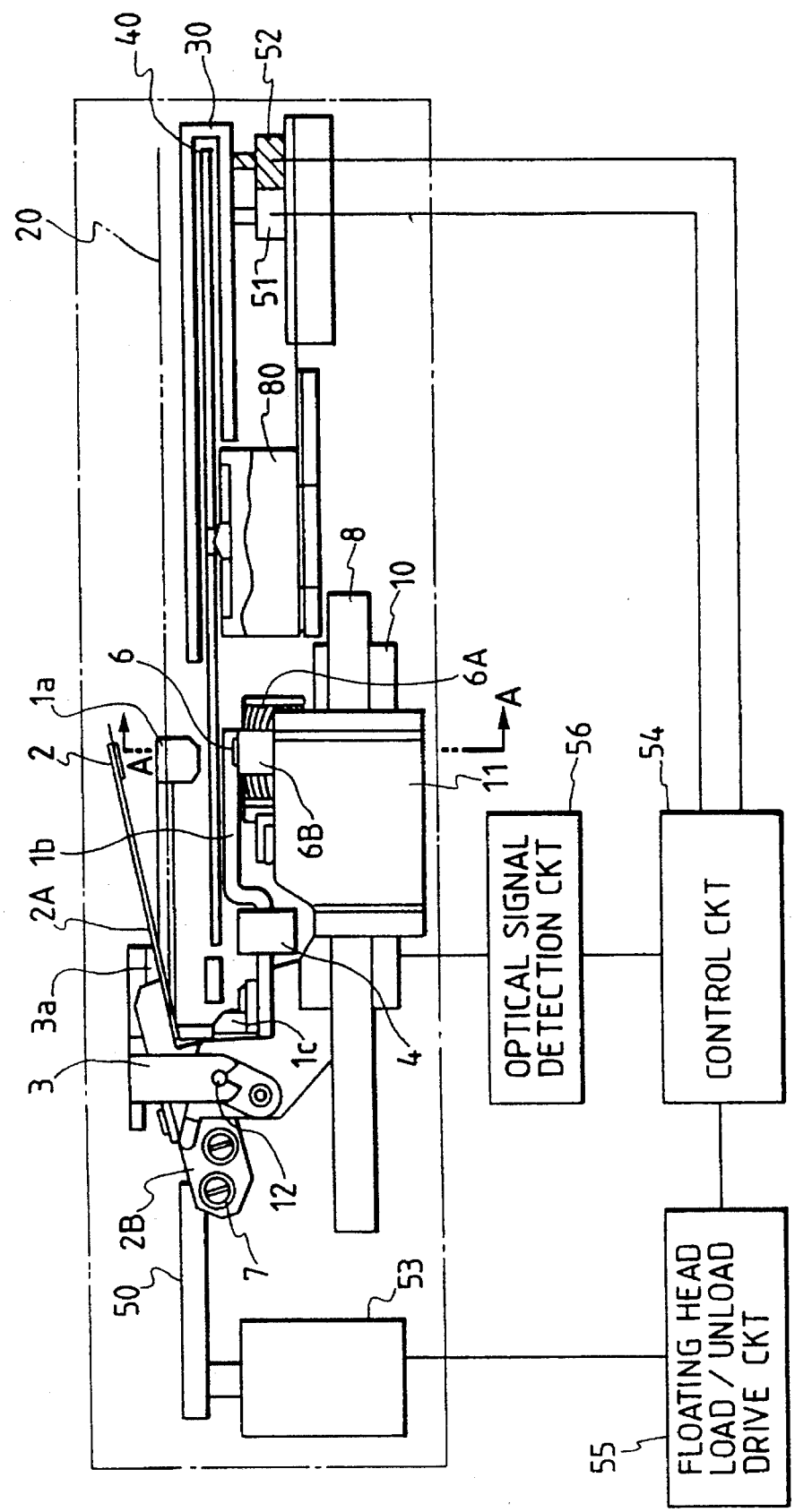
Figure 9:
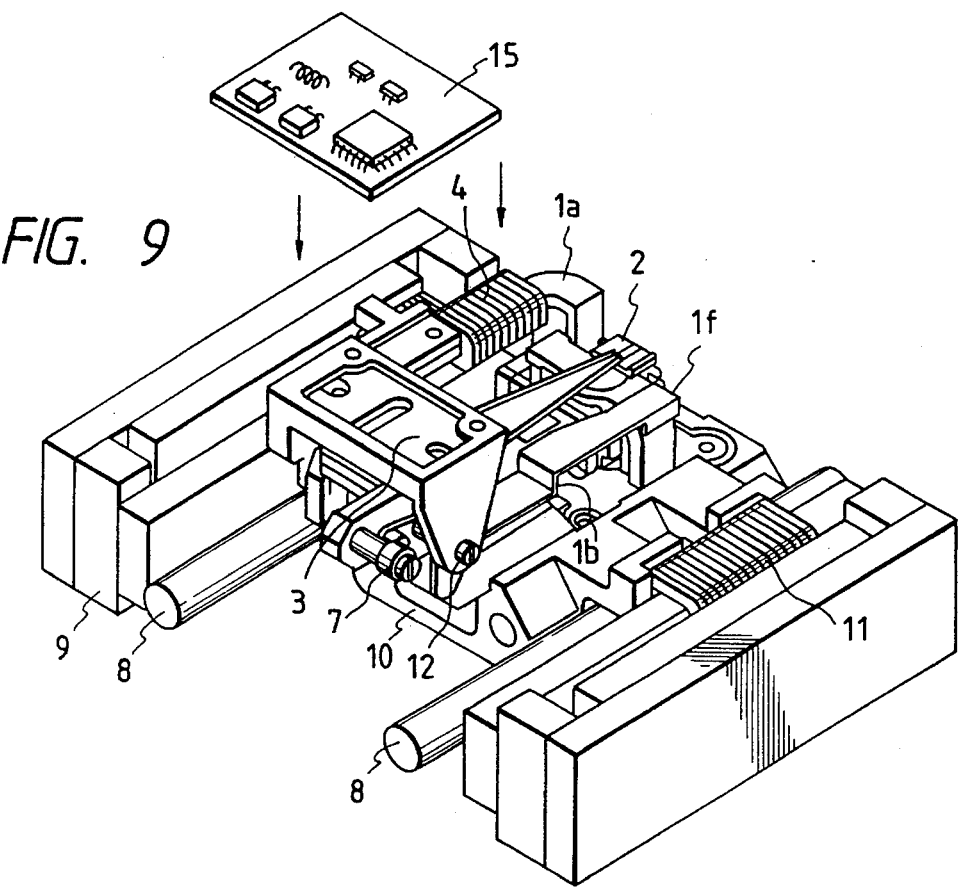
FIG. 9 is a perspective view to show a modification of the apparatus as shown in FIG. 4.
Figure 10:
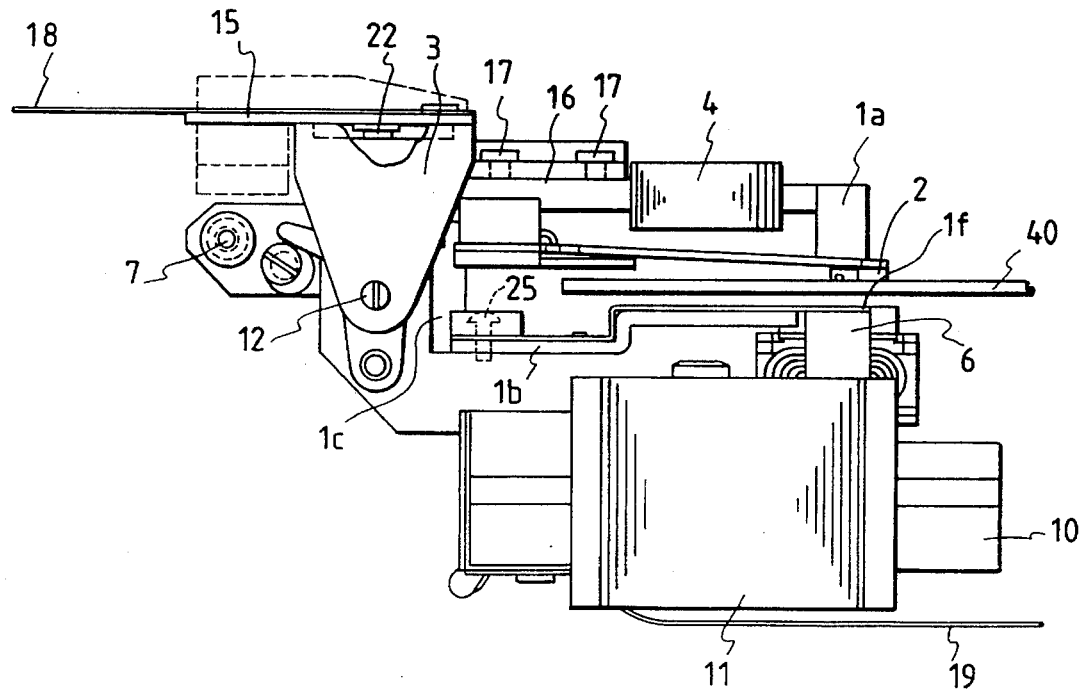
FIG. 10 is a side view of the modification as shown in FIG. 9.

In contrast, when the sensor 51 judges that the magneto-optical disk 40 is for optical modulation, the step-back lever 50 is kept down as shown in FIG. 7 to maintain the support member 2B at the step-back position, and only the core member 1 is in an operating state as shown in FIG. 8A, whereby recording or reproduction may be carried out by the second bias magnetic field generating apparatus B.

In such an arrangement, the bias magnetic field generating portions of both the bias magnetic field generating apparatuses move together with the carriage 10 during the seeking operation and the tracking control of the carriage 10, which requires no position detection or adjustment of the magnetic field generating portions relative to the beam spot, thus requiring no apparatus therefor and simplifying the structure of the apparatus. Also, the magnetic field generating portion for optical modulation may be produced in a more compact size while greatly decreasing a space for upward step-back, and the entire apparatus may be made thinner.

The electromagnet 4 for optical modulation can provide a sufficient magnetic field even if the field release surface is set apart from the recording surface of the disk at a greater distance than the surface fluctuation range of the disk. Thus, the electromagnet 4 need not be of a floating type as employed for the magnetic head for the magnetic field modulation. Further, since the electromagnet 4 can be loaded or unloaded irrespective of the position and the condition of the floating type slider 2 (magnetic head), the structure of the step-back mechanism of the magnetic head for magnetic field modulation may be simplified for mounting a disk for optical modulation or for an emergency such as a service interruption or other trouble. In the above embodiment, the mechanism (upper core support member 3) for loading or unloading the movable core member to the disk surface may be arranged to be interlocking with the mechanism for loading or unloading the disk cassette.

The electromagnet 4 for optical modulation is so arranged that an end 1a of the movable core member and an end 1b of the lower core member are deviated from the optical axis of objective lens 6, as shown in FIG. 8B and FIG. 8C. The end 1a is located obliquely above the end 1b while the optical axis is between them. In this arrangement, the orientation of the magnetic field generated in the gap between the ends 1a and 1b is inclined with respect to the optical axis of objective lens 6, and the magnetic field obliquely passes through the beam irradiated portion on the disk.

In this case, the beam-irradiated portion on the disk is given a magnetic moment sufficient to cause the magnetic inversion in a recording layer.

FIG. 9, FIG. 10, FIG. 11A, and FIG. 11B show a modification of the above embodiment, in which the core member 1 is provided with a spring core 1f in addition to the two upper and lower members and the joint member 1c and the coil of the electromagnet 4 is wound around the movable core member on the side where the first bias magnetic field generating apparatus is located. Further, a mechanism for loading or unloading the movable core member to the disk surface comprises an upper core supporting member 3 journaled about a common axis of the rotation shaft 12 on the carriage 10 in the same manner as in the above embodiment. Specifically in this modification, the movable core member is attached to the support member through an elastic sheet member 16 having a high thermal conductivity. The elastic sheet member 16 should be made of a material having a high adherence in view of the thermal conduction without consideration of the electric insulation. The material to be employed may be selected from a silicone rubber, a silicone rubber with fillers of mica or the like mixed therein, a copper foil, and so on.

Figure 11A:
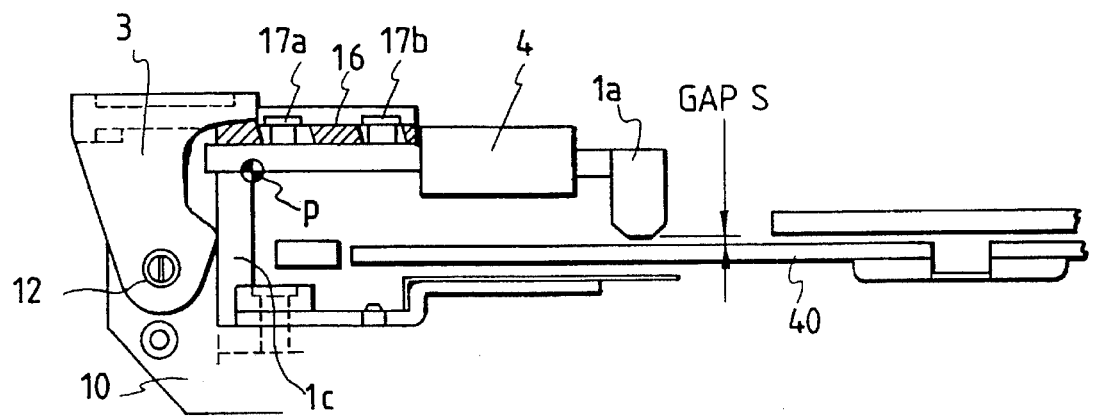
FIG. 11A and FIG. 11B are side views to show states of use of the modification as shown in FIG. 9.
Figure 11B:
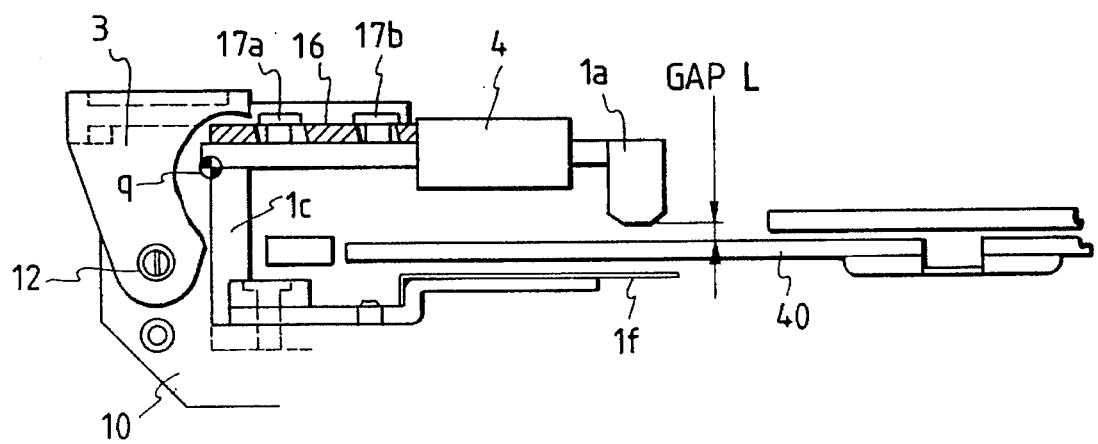

The elastic sheet member 16 is adhered to the movable core member in close contact to enhance the heat radiation property while controlling the gap of the core member 1 using its elastic deformation. In detail, the movable core member is attached to the support member 3 by means of screws 17a, 17b in the modification. For example, fastening the screw 17a deflects the elastic sheet member 16 between the movable core member and the support member 3, so that the movable core member is rotated about a pivot p relative to the joint core member 1c as shown in FIG. 11A to narrow the gap (gap $G_S$). On the other hand, fastening the screw 17b moves the pivot to a position q to enlarge the gap (gap $G_L$ as shown in FIG. 11B). A drive circuit board 15 of the magnetic head provided on the floating type slider 2 may be mounted on the support member 3 if desired. In this case, parts having a high heat generation value such as a current amplifying element 22 are to be mounted in contact with the support member 3 to enhance the heat radiation. A material of the support member 3 may be an aluminum alloy or a magnesium alloy, taking weight reduction and heat radiation into consideration.

In this modification, the lower core member extends to the vicinity of an actuator for focusing control of the objective lens 6, and the spring core 1f elastically contacts with a contour yoke, which corresponds to the coil 6A as described above.

The second embodiment of the present invention is next described.

The second embodiment is different from the first embodiment in that during recording or reproduction by the bias magnetic field generating apparatus A an AC voltage is applied to an electromagnet driving circuit for driving the electromagnet 4 of the bias magnetic field generating apparatus B in order to achieve demagnetization of the core member of the electromagnet.

The second embodiment is described below in detail with reference to FIG. 12 to FIG. 15, while omitting the description about members having the same functions as those in the first embodiment.

In FIG. 12 to FIG. 15, numeral 60 designates an electromagnet driving circuit for driving an electromagnet 4 of the bias magnetic field generating apparatus B. Further, numeral 57 denotes a DC voltage supply power source for supplying a DC voltage to the electromagnet driving circuit 60, 58 an AC voltage supply power source for supplying an AC voltage to the electromagnet driving circuit 60 in order to achieve demagnetization of the core member of the electromagnet, and 59 a change-over switch circuit selectively connecting the electromagnet driving circuit 60 either to the DC voltage supply power source 57 or to the AC voltage supply power source 58. The change-over switch circuit is controlled by a change-over control signal from a control circuit 54.

The operation in the second embodiment is next explained with reference to FIG. 12 to FIG. 14. Before the disk cassette 30 is loaded in the cassette holder 20 (see FIG. 12), the solenoid driving mechanism 53 pulls down the step-back lever 50 to rotate the support member 2B about the rotation shaft 12 then to move the slider 2, that is, the magnetic head of the first bias magnetic field generating apparatus, upward for step-back while the upper core support member 3 engages with the protrusion 20a of the cassette holder 20 through its engagement portion 3a to move the end 1a of the movable core member upward for step-back.

When the disk cassette 30 is loaded in the cassette holder 20, the cassette holder 20 descends to be set in the loading portion of the apparatus body. The sensors 51 and 52 work with recesses provided in the disk cassette 30 to detect a type of the magneto-optical disk 40 in the disk cassette 30, a load condition of the disk cassette, and whether writing is inhibited or not then to supply necessary signals to the control circuit 54. The magneto-optical disk 40 is driven by the spindle motor 80 to rotate at the same time. With control signals from the control circuit 54, the carriage 10 of the objective lens driving apparatus starts the seeking operation, the recording surface of the disk 40 is irradiated with a laser beam through the objective lens 6, and the tracking and focusing controls are carried out with information obtained from the reflected beam to access a beam spot to a desired address on the disk. Recording or reproduction is made in this state. While the cassette holder 20 is descending, the core support member 3 also descends with the engagement portion 3a engaging with the protrusion 20a so that the one end 1a of the movable core member approaches the recording surface of the magneto-optical disk 40 to the vicinity thereof.

Figure 13:
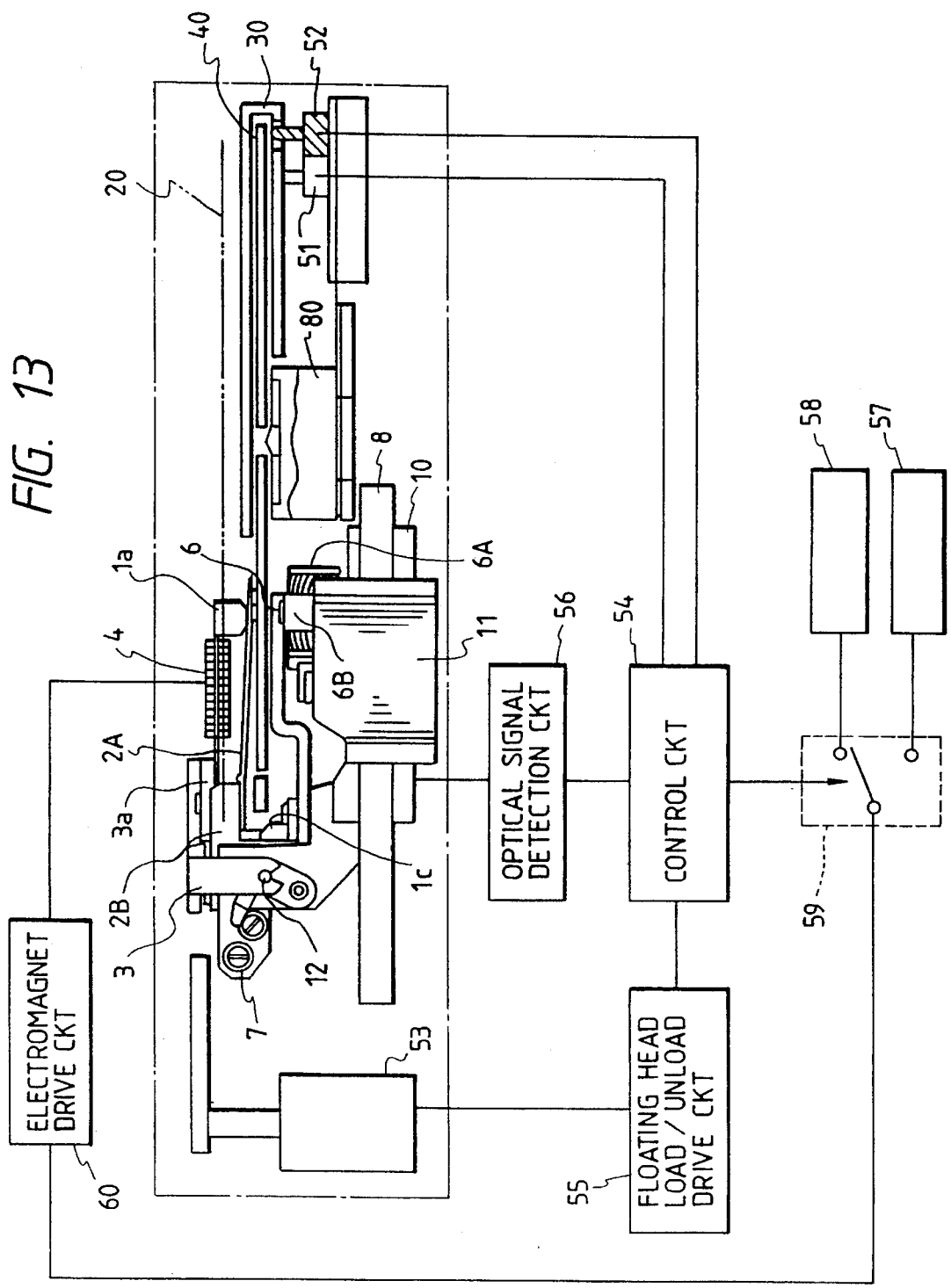

If the sensor 51 judges that the magneto-optical disk 40 is for magnetic field modulation, a signal is first supplied from the control circuit 54 to the change-over switch circuit 59 to apply an AC attenuating voltage to the electromagnet driving circuit 60 to effect the demagnetization effect on the core member 1, as shown in FIG. 13. A signal is then supplied from the control circuit 54 to the driving circuit 55 to drive the solenoid driving mechanism 53 to lift the step-back lever 50 and to return the support member 2B from the step-back position to the operating position while keeping the slider 2 floating over the recording surface of the magneto-optical disk 40 at a certain gap. Then, recording or reproduction is carried out by the first bias magnetic field generating apparatus A.

Figure 14:
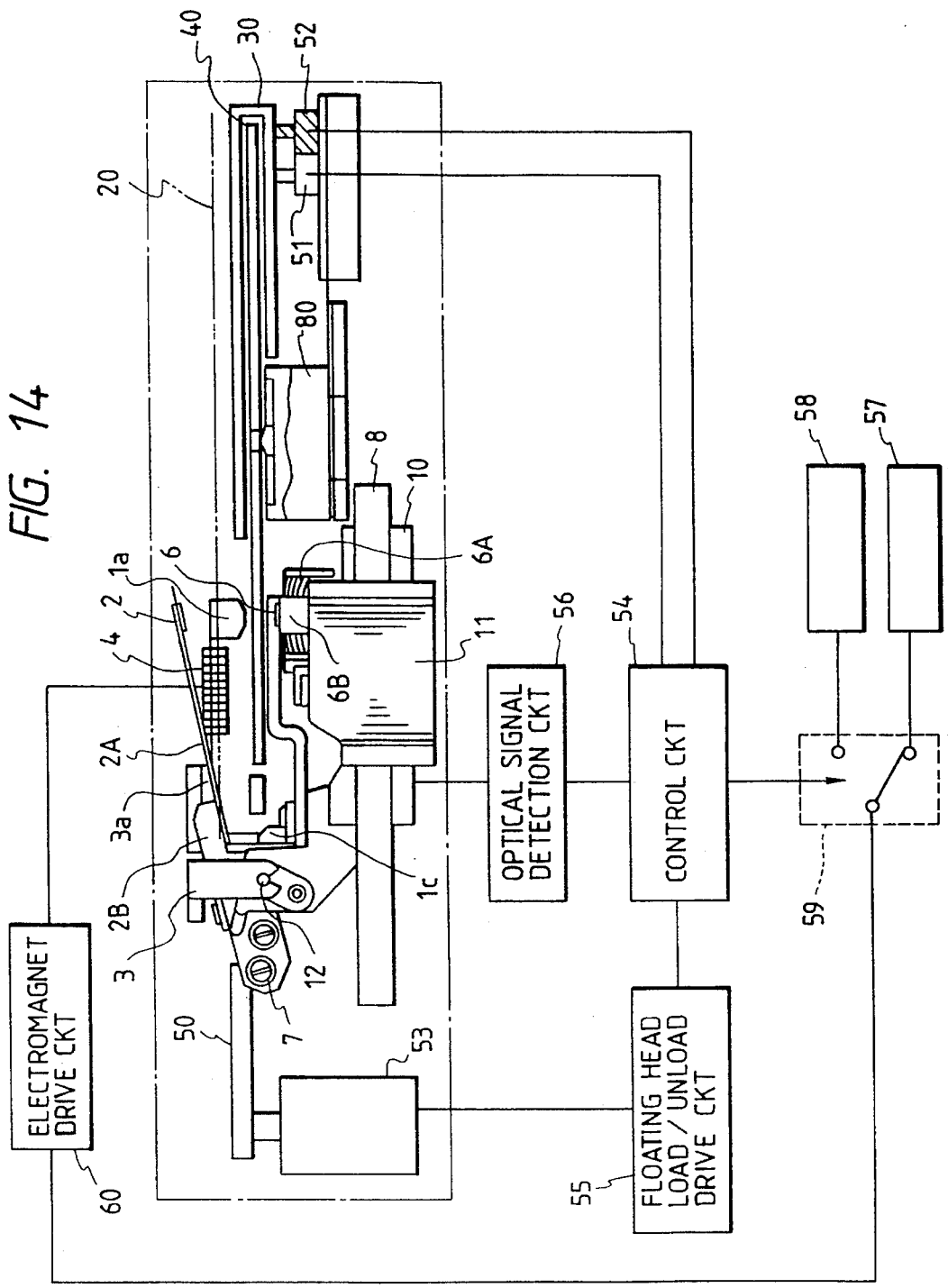

In contrast, if the sensor 51 judges that the magneto-optical disk 40 is for optical modulation, the step-back lever 50 is kept down to hold the support member 2B at the step-back position and only the core member 1 is set in an operating condition as shown in FIG. 14, whereby recording or reproduction is carried out by the second bias magnetic field generating apparatus B. The control circuit 54 controls the change-over switch circuit 59 such that a DC voltage is applied to the electromagnet circuit 60 to make the core member 1 generate a constant magnetic field.

Figure 15:
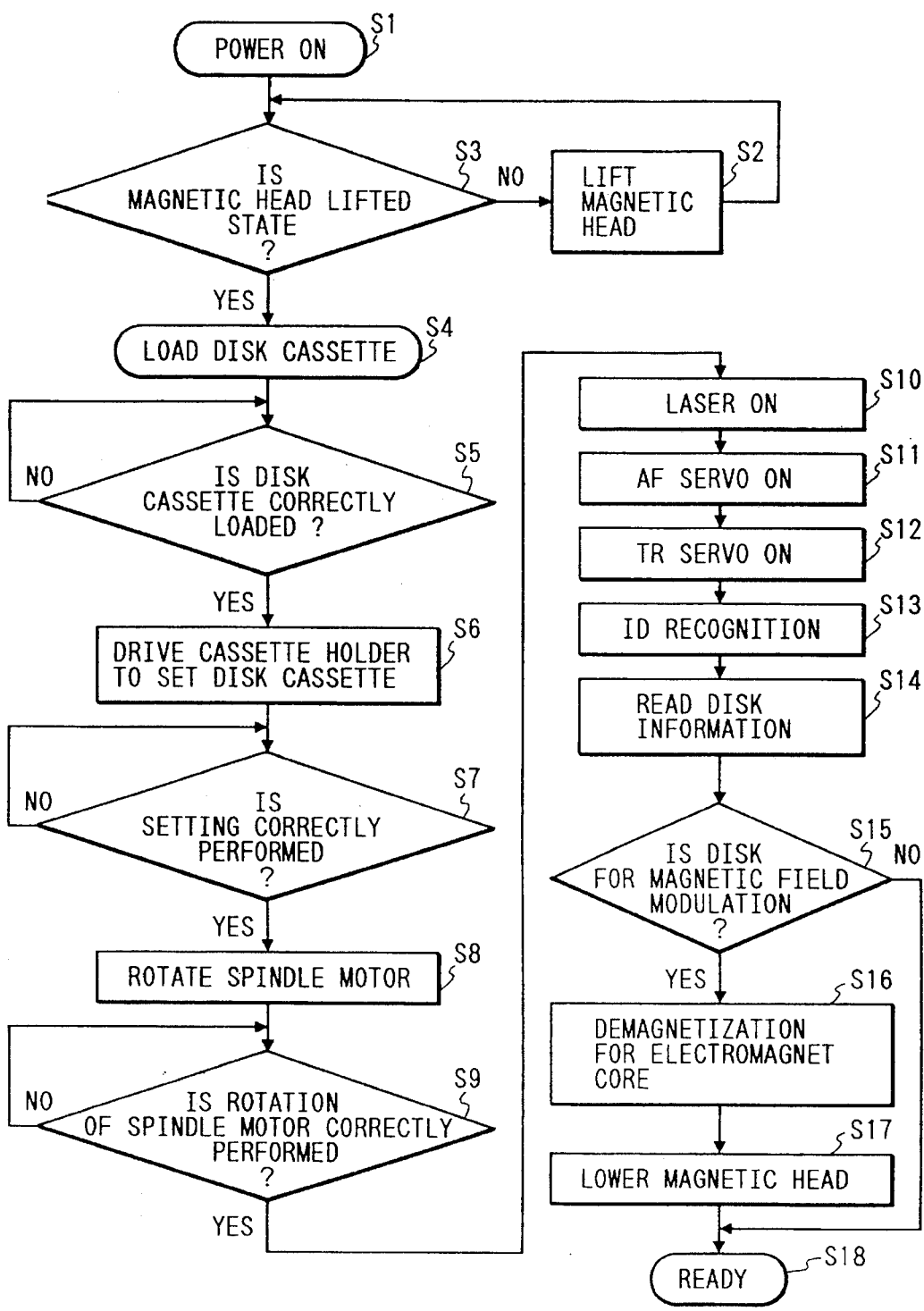
FIG. 15 is a flowchart for judging a disk type in the second embodiment of the present invention.

The following discussion describes with reference to FIG. 15 how to conduct the judgment of the type of disk in the control circuit 54. The power source is first turned on at Step S1, and it is judged at next Step S2 whether the magnetic head for magnetic field modulation and the movable core member are at the step-back position. If not at the step-back position, the flow goes to Step S3 to lift them up (see FIG. 12). If they are at the step-back position, the flow proceeds to Step S4 to start the loading operation of the disk cassette into the cassette holder. It is judged at Step S5 whether the load of the disk cassette is correctly performed. If the cassette is correctly loaded, the flow goes to Step S6 to drive the cassette holder to set the disk cassette in the loading portion for recording and reproduction. Further, it is judged at Step S7 whether the setting is correctly performed. The spindle motor is then rotated at Step S8, and it is judged at Step S9 whether the rotation of the spindle motor is correctly performed. The laser power source is then turned on at Step S10, and the autofocus control and the tracking control are carried out at Step S11 and at Step S12. An index of the disk is recognized at Step S13, and disk information is read from the disk at Step S14. It is judged at Step S15 with the disk information and other information from the respective detection sensors whether the disk is for magnetic field modulation. If it is for magnetic field modulation, the demagnetization of the electromagnet 4 is conducted at Step S16. The magnetic head for magnetic field modulation is lowered at Step S17, and the flow proceeds to final Step S18 (READY). If it is judged at Step S15 that the disk is not for magnetic field modulation, the flow goes to final Step S18 to conclude the judgement.

The demagnetization of the core member is effected before recording by the magnetic field modulation method in the above embodiment, but the demagnetization may be carried out during cassette loading or in a stand-by state of the apparatus after the circuit is closed. By this, the margin of the applied magnetic field may be reduced so as to save the drive power of the electromagnet 4.

Although the coil of the electromagnet 4 is provided at one portion of the core member 1 in the above embodiment, a plurality of coils may be set at suitable portions. Also, although only the upper core member is structured to be movable for step-back in the above embodiment, the lower core member may be structured to be movable. Further, if a slight decrease in efficiency of magnetic field generation is permitted, the core member 1 may be constructed only with the movable core member, omitting the core member on the side of the objective lens 6 (in the shape of an L as a whole).

The third embodiment of the present invention is next described.

The third embodiment has advantages of removing the influence of the floating magnetic field of the magnetic circuit for the objective lens drive and the like and of enhancing the efficiency of magnetic field generation of the bias magnetic field generating apparatus B, as compared to the first and second embodiments as described.

The third embodiment is below described in detail with reference to FIG. 16, FIG. 17A, and FIG. 17B.

The third embodiment features the bias magnetic field generating apparatus B and the structure of the objective lens driving apparatus (which was simply called the optical system in the first and second embodiments as described). Accordingly, only the structures of the two apparatuses are explained here, and the members with the same functions are denoted by the same numerals, omitting the description thereof.

Figure 16:
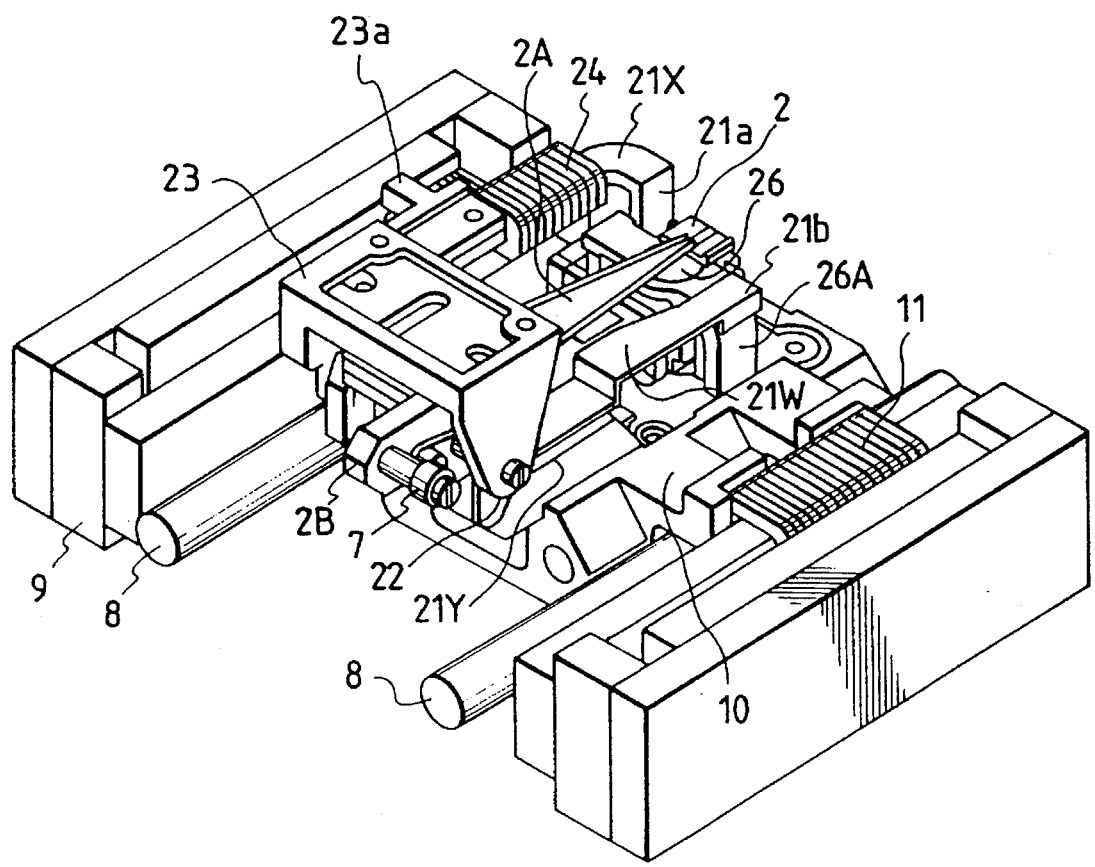
FIG. 16 is a perspective view to show a third embodiment of the present invention.
Figure 17A:
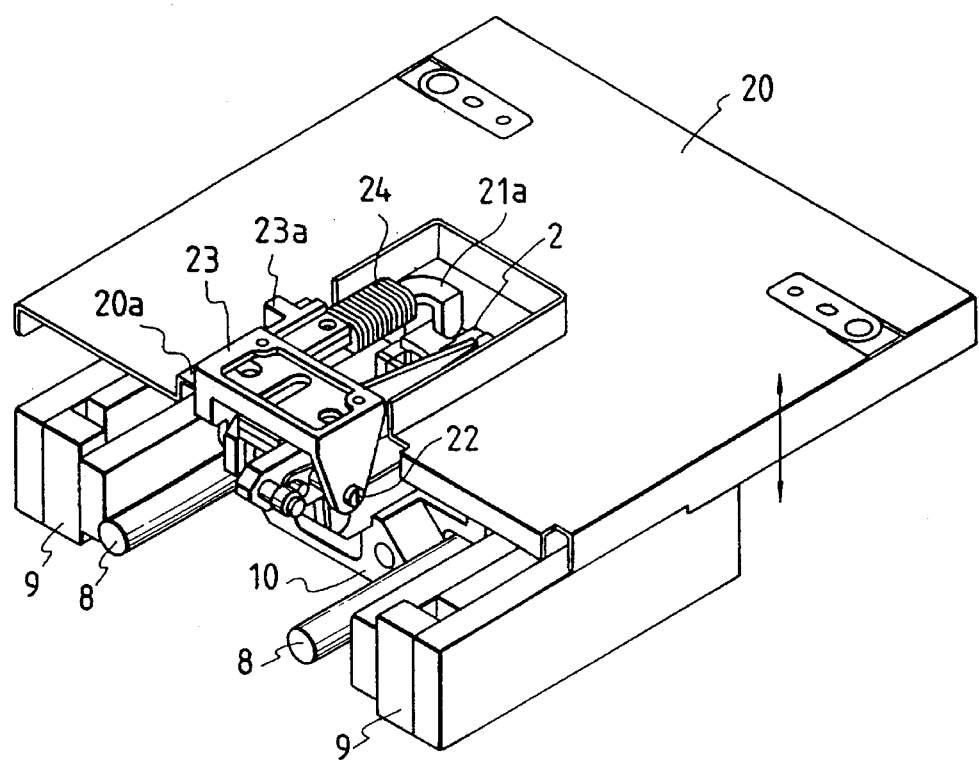
FIG. 17A and FIG. 17B are a perspective view to show a positional relation between the apparatus as shown in FIG. 16 and a cassette holder and a perspective view to show an objective lens driving apparatus in the apparatus as shown in FIG. 16, respectively.

In FIG. 16, the bias magnetic field generating apparatus B is composed of a core member 21 mounted on a carriage 10 and a coil 24 wound around the core member. The core member 21 is of a substantial ring shape having a gap at a part thereof and has two ends 21a, 21b located on either side of the magneto-optical disk 40 such that a small region of a beam spot formed on the disk surface of the magneto-optical disk 40 through an optical system (as described below) mounted on the carriage 10 is located in the gap. The optical system is comprised of an objective lens 26 and a lens holder 26B. The lens holder 26B is movable up and down and left to right by means of a magnetic circuit, which is comprised of a coil 26A (26A'), yokes 26C, 26D connected to each other, and a permanent magnet 26E. When a voltage is applied to the coil 26A (26A'), the objective lens 26 is moved up and down and left to right for focusing and tracking controls. The yoke 26D extends in the plane of the disk surface of the magneto-optical disk and surrounds the objective lens 26 in this embodiment, as shown in FIG. 17B. Thus, the yoke 26D composes a closed magnetic path with the yoke 26C, forming the magnetic circuit for driving the objective lens, as shown in FIG. 17B. As a result, the magnetic field shielding effect may be enhanced thereby, so that the negative influence of the floating magnetic field may be avoided on the recording magnetic field during recording in the magnetic field modulation.

The core member 21 is composed of at least two members, specifically in the present embodiment three members, two of which are upper and lower members 21X, 21Y and the other of which is a joint core member 21Z. The one member 21X is a movable core member forming one end in the gap portion on the side where the bias magnetic field generating apparatus A is located. A mechanism for loading or unloading the movable core member 21X to the disk surface comprises an upper core support member 23 journaled about a rotation shaft 22 on the carriage 10, to which the movable core member 21X is attached. An engagement portion 23a is provided on the upper core support member 23, which engages with a protrusion 20a provided on the cassette holder 20 while the cassette holder 20 is lifted up from the loading portion to take the disk cassette 30 out, whereby the movable core member is lifted up. In this embodiment, the coil 24 is wound around the upper core member 21X, and the lower core member 21Y and the joint core member 21Z are fixedly supported on the carriage 20 in such a state that they are joined to each other. Then, when the one end 21a of the movable core member 21X is brought to the vicinity of the recording surface of the magneto-optical disk 40, the upper end 21c of the joint core member 21Z contacts with the bottom end 21d of the movable core member 21X, whereby constituting the core member 21 of C shape, magnetically continuous as a whole (in the shape of a substantial ring having a gap). Also, a thin plate 21W made of a material having a high magnetic flux density is attached to the lower core member 21Y, which extends to the yoke 26D and elastically contacts therewith. Thus, a part of the yoke 26D constituting the magnetic circuit for objective lens drive in the optical head may be used as a part of the core member 21, whereby the resistance of the magnetic path may be reduced and the drive efficiency may be improved in recording by the optical modulation method.

The operation in the above-described arrangement is the same as in the first embodiment as described.

The thin plate attached to the lower core member may be any member having a high magnetic flux density and a low coercive force. Thus, the thin plate may be made of iron or an alloy thereof. Also, the thin plate may be a thin plate of a resin material with a film made of the above material having the high magnetic flux density, or a thin plate made of a polymer material having magnetism. Further, if conditions are permissible, the shape may not be of a thin plate, but for example of a coil spring. Although the loading or unloading operation of the core member is made possible by making the cassette holder contact with a part of the core support member 23 holding the core member in this embodiment, the operation can be achieved by provision of a mechanism driven not in synchronism with the other mechanisms in the same manner as in the mechanism for loading or unloading the magnetic head for magnetic field modulation.

The fourth embodiment of the present invention is next described in detail.

In the present embodiment, elements having the same functions as those in the previous embodiments are denoted by the same reference numerals, and discussed is omitted herein.

The present embodiment is different from the previous embodiments in that the electromagnet for optical modulation is secured to the cassette holder.

Figure 18:
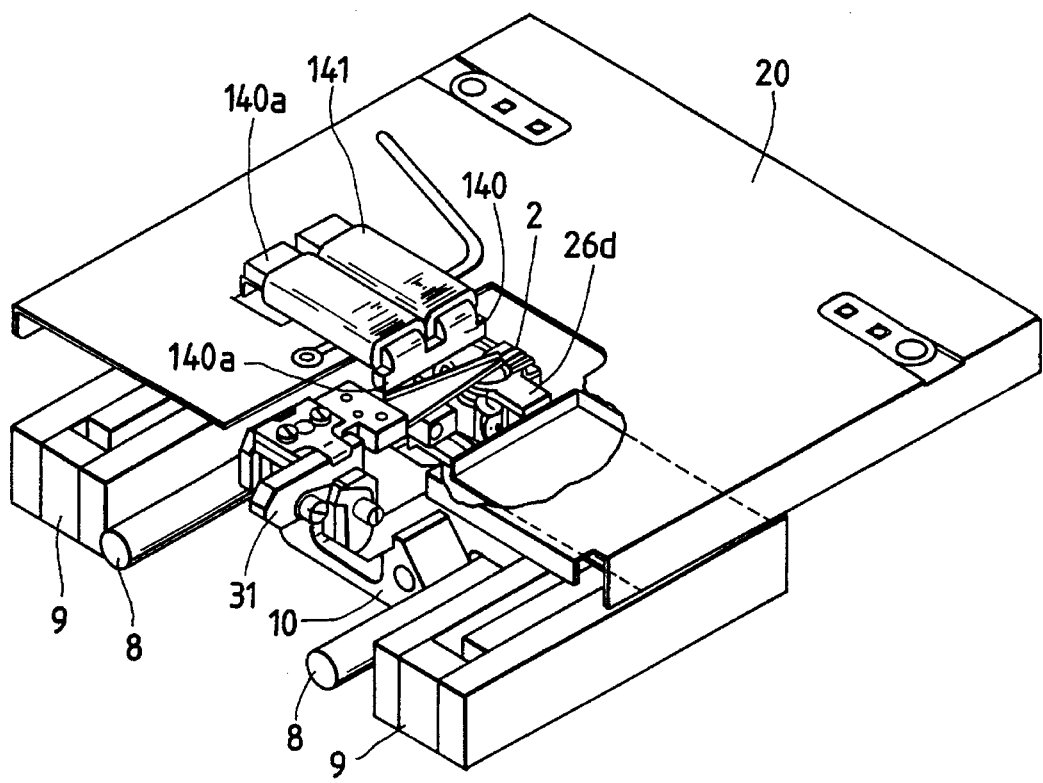
FIG. 18 is a perspective view to show a fourth embodiment of the present invention.

FIG. 18 is a schematic perspective view of the magneto-optical disk apparatus in the fourth embodiment of the present invention. A seeking motor comprised of a magnetic circuit 9 and a coil 11 carries out the seeking operation to move a floating slider 2 on which an optical system 26 mounted on a carriage 10 and a magnetic head for magnetic field modulation are mounted, along guide rails 8 through bearings.

The floating slider 2 is attached to a lift mechanism 31 rotatably set on the carriage 10 so that the slider 2 can step back from the magneto-optical information recording medium in the form of a disk (as will be referred to as a disk) with operation of the lift mechanism. For this, for example, an arm supporting the floating slider 2 is journaled on the carriage 10 and provided with a contact portion which rotatably and slidably contacts with a magnetic head step-back lever (not shown) so as to follow the motion of the step-back lever.

Numerals 140, 140a, 141 denote an electromagnet for magnetic bias or for optical modulation, secured to the cassette holder 20. This electromagnet is so constructed that a magnetic core portion of core 140 extends in parallel with the recording surface of the disk and a tip portion 140a thereof is bent toward the recording surface through an aperture of cassette holder 20, whereby a flux guide portion continuous from the magnetic core portion is formed. Further, a magnetic field release face formed at the lower end of the flux guide portion is in close vicinity to the area of movement of floating slider 2 while extending in the radial direction of the information recording medium. Also, a coil 141 is wound around the extending portion of core 140 parallel to the disk, that is, around the magnetic core portion. The electromagnet is mounted on the cassette holder 50 which is used when a disk cassette is loaded into or unloaded out of the apparatus.

Figure 19:
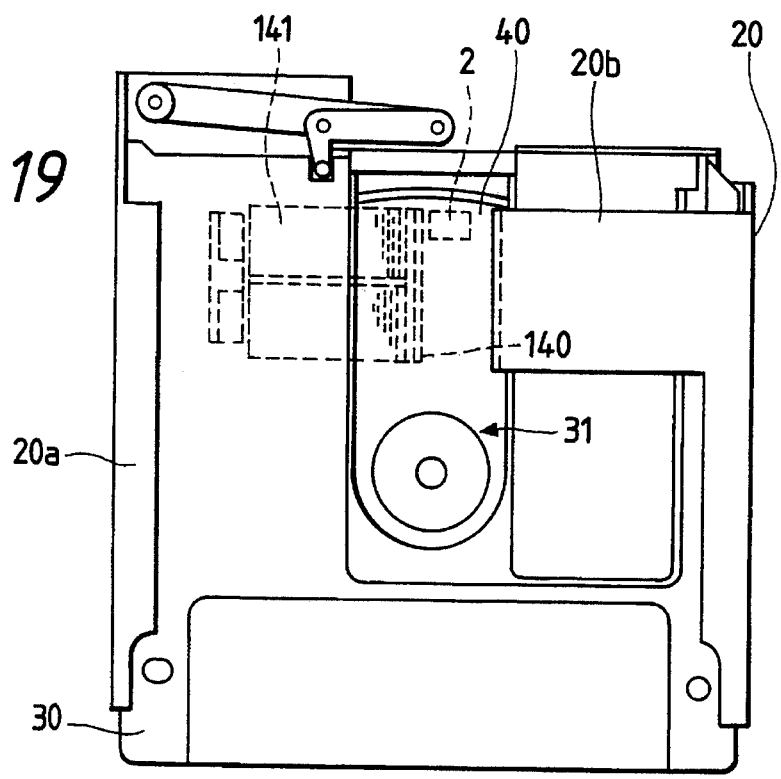
FIG. 19 is a plan view to show a cassette holder 20 in FIG. 18 as seen from the optical system side.

FIG. 19 shows a state of the cassette holder 20 as seen from the optical system 26 side. The cassette holder 20 has a bent portion 20a in the shape of a "U" for holding a cassette 30, and the portion 20a includes a portion 20b extending up to a window 31 of cassette 30 into which the optical system 26 is inserted. These portions constitute a part (or all) of a yoke member which is a return path of magnetic flux to the core 140. In other words, the part of cassette holder 20 along the disk serves as a yoke member such that the magnetic flux from the magnetic field release face passes through the disk and comes out on the opposite side then to return to the core through the yoke member on the peripheral edge side of the disk, constituting a loop magnetic path. The cassette holder 20 is of course made of a magnetic material.

Figure 20:
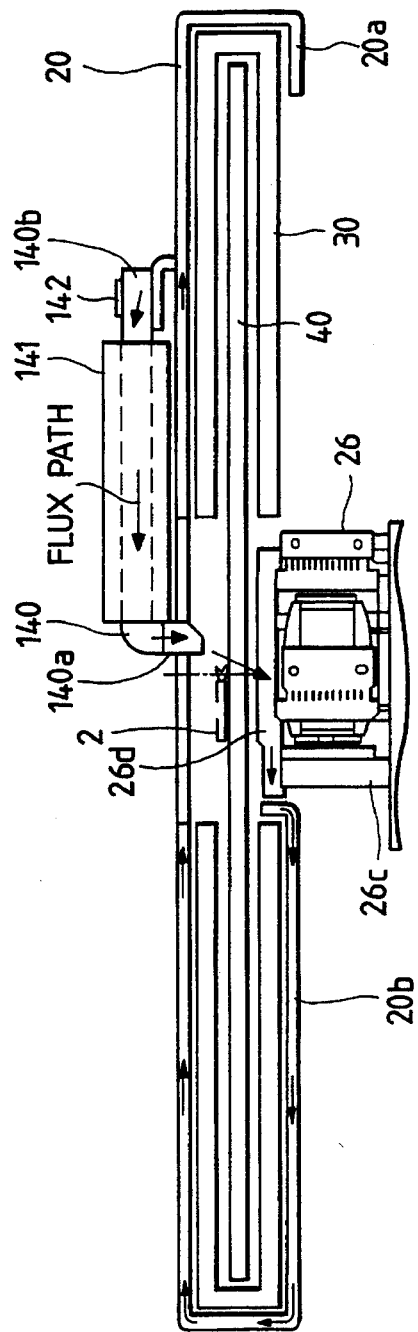
FIG. 20 is a cross section to illustrate the function of the structure shown in FIG. 18.

The details are illustrated by the magnetic path (arrows) shown in FIG. 20. In detail, a magnetic flux, which is produced in the core 140 by a direct current voltage applied to the coil 141, is directed from the magnetic field release face of flux guide portion 140a disposed beside the floating slider 2 toward a ferromagnetic member 26D which is a path with low flux path resistance and is disposed on the upper surface of the immediately-below-located optical system 26.

Figure 17B:
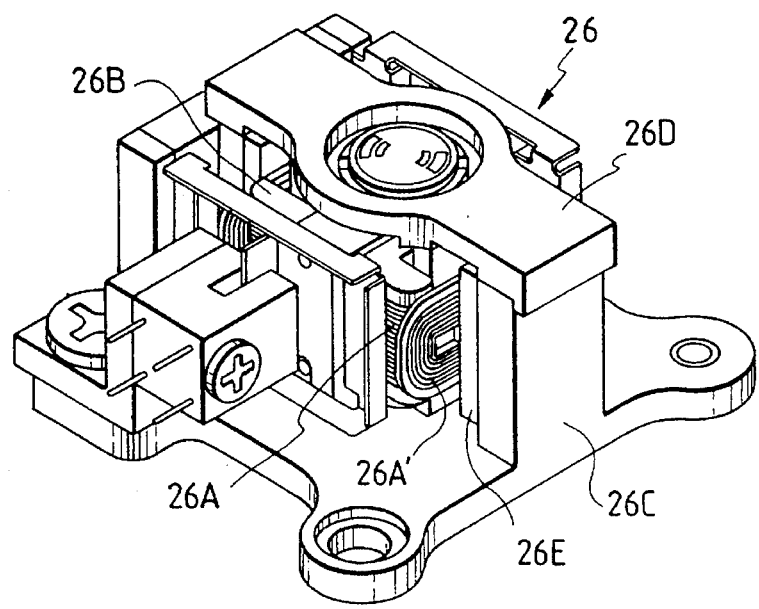

The ferromagnetic member 26D constitutes a magnetic circuit of an actuator for the objective lens in optical system 26, that is, a part of a yoke (see FIG. 17B).

The released magnetic flux has the orientation of a magnetic field inclined with respect to the optical axis of objective lens 6, and the main flux enters the beam-irradiated portion on the disk obliquely because the flux guide portion 140a is located beside the moving area of floating slider 2. The oblique magnetic flux can provide a magnetic moment effective enough for magnetization and inversion of a magnetic domain formed on the recording surface of disk 40. The magnetic flux reaching the ferromagnetic member 26D passes through the portion 20b of the cassette holder extending up to the window 31 and then through the cassette holder 20 to return to the opposite end 140b of core 140. There are two gaps in this embodiment, one between the flux guide portion 140a and the ferromagnetic member 26D and the other between the ferromagnetic member 26D and the extending portion 20b of the cassette holder, but high-efficiency generation of the magnetic field is possible because of the formation of a closed path of substantial loop.

Figure 21:
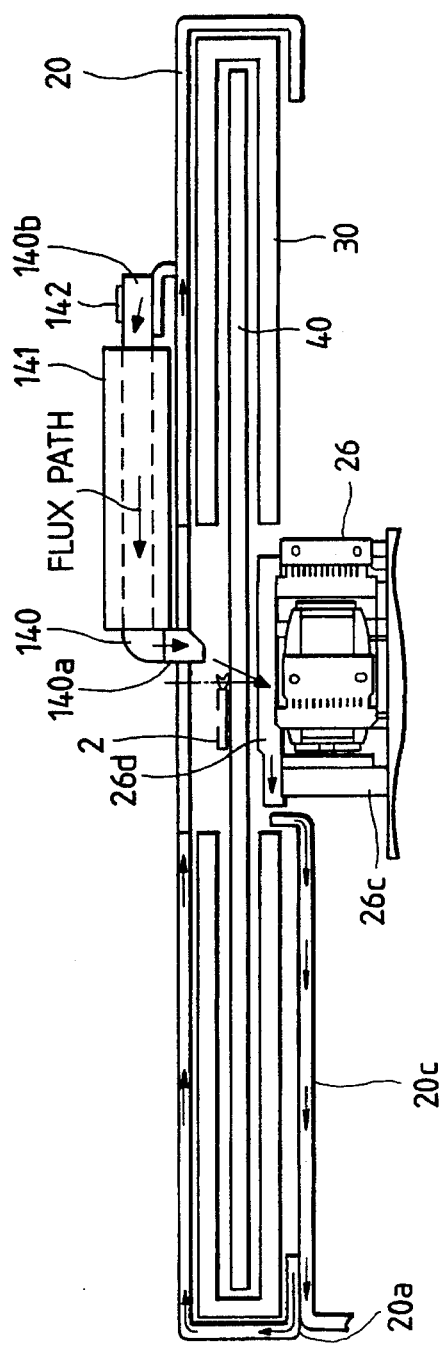
FIG. 21 is a cross section to show a modification of the structure shown in FIG. 18.

The flux return path to the core 140 is formed in the fourth embodiment by a part of cassette holder 20 and the ferromagnetic member 26D mounted on the optical system 26, but the portion 20c adjacent to the ferromagnetic member 26D in window 31 may be formed of a magnetic member independent of the cassette holder 20 and located on the fixed portion side, as shown in a modification in FIG. 21. In this case, the cassette holder 20 and the magnetic member 20c must be arranged to contact or approach each other when the disk is mounted. Specifically, FIG. 21 shows an example in which the magnetic member 20c is in contact with the portion 20a bent in the shape of a "U" in order to hold the cassette 30.

What is claimed is:

1. A magneto-optical disk apparatus which performs at least one of recording of information on and reproduction of information from a magneto-optical recording medium of a disk shape, said apparatus comprising:

optical means comprising an objective lens, for irradiating the medium with a light beam modulated according to information to be recorded on the medium, when optical modulation recording is executed, and for irradiating the medium with a light beam which is not modulated according to the information to be recorded on the medium, when magnetic field modulation recording is executed;

first magnetic field applying means for applying a magnetic field modulated according to the information to be recorded to a portion on the medium which is irradiated with the light beam which is not modulated according to the information, when the magnetic field modulation recording is executed, said first magnetic field applying means comprising a magnetic head for generating a magnetic field and a floating-type slider for supporting said magnetic head; and second magnetic field applying means for applying a constant magnetic field, an orientation of which is inclined with respect to an optical axis of said objective lens, to a portion on the medium which is irradiated with the light beam which is modulated according to the information, when the optical modulation recording is executed.

2. A magneto-optical disk apparatus according to claim 1, wherein said second magnetic field applying means comprises a core member of a substantial ring shape having a gap portion in a part thereof and a coil wound around a part of said core member, and wherein one end of said core member in the gap portion is set to be located near the beam irradiated portion of the medium and a position deviated from the optical axis of said objective lens, and the other end thereof is set to be located opposite to the one end so as to sandwich the medium and the optical axis therebetween.

3. A magneto-optical disk apparatus which performs at least one of recording of information on and reproduction of information from a magneto-optical recording medium of a disk shape, said apparatus comprising:

optical means comprising an objective lens, for irradiating the medium with a light beam;

first magnetic field applying means for applying a magnetic field modulated according to information to a portion on the medium which is irradiated with the light beam, said first magnetic field applying means comprising a magnetic head for generating a magnetic field and a floating-type slider for supporting said magnetic head;

second magnetic field applying means for applying to the irradiated portion on the medium a constant magnetic field, an orientation of which is inclined with respect to an optical axis of said objective lens, wherein said second magnetic field applying means comprises a core member of a substantial ring shape having a gap in a part thereof and a coil wound around a part of said core member, said core member having two ends located on either side of the medium such that the gap is positioned at the beam irradiated portion;

moving means for moving said first and second magnetic field applying means and said optical means together in a radial direction of the medium; and step-back means for making said first and second magnetic field applying means step back from near the medium.

4. A magneto-optical disk apparatus according to claim 3, wherein said step-back means comprises a first step back mechanism for making said second magnetic field applying means step back from near the medium in mechanical synchronism with a carrying operation of the medium in the apparatus.

5. A magneto-optical disk apparatus according to claim 4, wherein said step-back means comprises means for judging a type of the medium and a second step-back mechanism for making said first magnetic field applying means step back from near the medium in accordance with a judgement result of said judging means.

6. A magneto-optical disk apparatus according to claim 5, wherein said judging means judges whether the medium is a recording medium for optical modulation recording or a recording medium for magnetic field modulation recording.

7. A magneto-optical disk apparatus according to claim 4, wherein said first step-back mechanism rotates said second magnetic field applying means about a rotation shaft provided on said moving means to effect step-back thereof.

8. A magneto-optical disk apparatus according to claim 7, further comprising a holder for carrying the medium in the apparatus, wherein said first step-back mechanism makes said second magnetic field applying means step back from near the recording medium in mechanical synchronism with an up and down motion of said holder in the apparatus.

9. A magneto-optical disk apparatus according to claim 5, wherein said step-back means further comprises means for detecting whether the medium is loaded at a desired loading position in the apparatus and wherein said second step-back mechanism makes said first magnetic field applying means step back from near the medium when said detecting means detects that the medium is not loaded at the desired loading position.

10. A magneto-optical disk apparatus according to claim 4, wherein said first step-back mechanism makes only a part of the core member of said second magnetic field applying means step back from near the medium.

11. A magneto-optical disk apparatus according to claim 4, wherein a part of said first step-back mechanism is constructed of a material and in a shape having a heat radiation effect.

12. A magneto-optical disk apparatus according to claim 4, wherein said first step-back mechanism is connected through an elastic member with a high thermal conductivity to said second magnetic field applying means.

13. A magneto-optical disk apparatus according to claim 1, wherein said optical means further comprises objective lens driving means for moving said objective lens relative to the medium.

14. A magneto-optical disk apparatus according to claim 13, wherein said objective lens driving means comprises an objective lens holder for holding said objective lens, a coil disposed on said objective lens holder, a permanent magnet for applying a magnetic field to said coil, and a yoke.

15. A magneto-optical disk apparatus according to claim 2, wherein said optical means further comprises objective lens driving means for moving said objective lens relative to the medium.

16. A magneto-optical disk apparatus according to claim 15, wherein said objective lens driving means comprises an objective lens holder for holding said objective lens, a coil disposed on said objective lens holder, a permanent magnet for applying a magnetic field to said coil, and a yoke.

17. A magneto-optical disk apparatus which performs at least one of recording of information on and reproduction of information from a magneto-optical recording medium of a disk shape, said apparatus comprising:

optical means comprising an objective lens, for irradiating the medium with a light beam, and objective lens driving means for moving said objective lens relative to the medium, wherein said objective lens driving means comprises an objective lens holder for holding said objective lens, a coil disposed on said objective lens holder, a permanent magnet for applying a magnetic field to said coil, and a yoke;

first magnetic field applying means for applying a magnetic field modulated according to information to a portion on the medium which is irradiated with the light beam, said first magnetic field applying means comprising a magnetic head for generating a magnetic field and a floating-type slider for supporting said magnetic head;

second magnetic field applying means for applying to the irradiated portion on the medium a constant magnetic field an orientation of which is inclined with respect to an optical axis of said objective lens, wherein said second magnetic field applying means comprises a core member of a substantial ring shape having a gap in a part thereof and a coil wound around a part of said core member, said core member having two ends located on either side of the medium such that the gap is positioned at the beam irradiated portion, wherein said core member of said second magnetic field applying means is magnetically connected to the yoke of said objective lens driving means; and moving means for moving said first and second magnetic field applying means and said optical means together in a radial direction of the medium.

18. A magneto-optical disk apparatus according to claim 17, wherein said core member is magnetically connected to said yoke through a thin plate made of a material having a high magnetic flux density.

19. A magneto-optical disk apparatus according to claim 1, wherein said second magnetic field applying means performs no operation when said first magnetic field applying means is in operation.

20. A magneto-optical disk apparatus according to claim 1, wherein an AC attenuating voltage is applied to the coil of said second magnetic field applying means when said second magnetic field applying means is not operating; and moving means for moving said first and second magnetic field applying means and said optical means together in a radial direction of the medium.

21. A magneto-optical disk apparatus according to claim 1, further comprising a holder for carrying the medium in the apparatus, wherein said second magnetic field applying means is secured to said holder.

22. A magneto-optical disk apparatus according to claim 21, wherein said holder is made of a magnetic material and wherein said second magnetic field applying means and said holder form a closed magnetic path.

* * * * *

UNITED STATES PATENT AND TRADEMARK OFFICE
CERTIFICATE OF CORRECTION

PATENT NO. : 5,485,434
DATED : January 16, 1996
INVENTOR(S) : Masahiko CHAYA

It is certified that error appears in the above-indentified patent and that said Letters Patent is hereby corrected as shown below:

ON THE COVER PAGE:

In the Title:

"MAGNE TO-OPTICAL" should read --MAGNETO-OPTICAL--.

Under "Foreign Application Priority Data":

The following should be inserted:

--Feb. 13, 1992 [JP] Japan .......... 4-058816
  Feb. 24, 1992 [JP] Japan .......... 4-072118
  May 13, 1992 [JP] Japan .......... 4-146959--.

COLUMN 1:

Line 1, "MAGNE TO-OPTICAL" should read --MAGNETO-OPTICAL--.

UNITED STATES PATENT AND TRADEMARK OFFICE
CERTIFICATE OF CORRECTION

PATENT NO. : 5,485,434
DATED : January 16, 1996
INVENTOR(S) : Masahiko CHAYA

It is certified that error appears in the above-indentified patent and that said Letters Patent is hereby corrected as shown below:

COLUMN 4:

Line 38, "and" should be deleted;
Line 43, "respectively." should read --respectively;--.

COLUMN 12:

Line 5, "discussed is" should read --discussion thereof is--.

Signed and Sealed this

Eleventh Day of June, 1996

Attest:

BRUCE LEHMAN

*Attesting Officer*           *Commissioner of Patents and Trademarks*